US007785432B2

(12) United States Patent
Lenhardt

(10) Patent No.: US 7,785,432 B2
(45) Date of Patent: Aug. 31, 2010

(54) METHOD FOR POSITIONING SHEETS OF GLASS IN A VERTICAL ASSEMBLY AND PRESS DEVICE FOR INSULATING GLASS PANES

(76) Inventor: Karl Lenhardt, Im Weidenfeld 8, D-75378 Bad Liebenzell (DE)

(*) Notice: Subject to any disclaimer, the term of this patent is extended or adjusted under 35 U.S.C. 154(b) by 993 days.

(21) Appl. No.: 10/590,836

(22) PCT Filed: Feb. 24, 2005

(86) PCT No.: PCT/EP2005/001929

§ 371 (c)(1),
(2), (4) Date: Sep. 11, 2006

(87) PCT Pub. No.: WO2005/080734

PCT Pub. Date: Sep. 1, 2005

(65) Prior Publication Data

US 2007/0175733 A1 Aug. 2, 2007

(30) Foreign Application Priority Data

Feb. 25, 2004 (DE) ....................... 10 2004 009 858

(51) Int. Cl.
*B32B 17/00* (2006.01)
*C03C 27/00* (2006.01)
*E06B 3/24* (2006.01)

(52) U.S. Cl. .......................... 156/109; 156/99; 156/497

(58) Field of Classification Search .................. 65/17.1; 156/99, 109; 52/78.1–786.13
See application file for complete search history.

(56) References Cited

U.S. PATENT DOCUMENTS 4,434,024 A * 2/1984 Lisec ......................... 156/556
4,495,023 A * 1/1985 Lisec ......................... 156/562
4,708,762 A * 11/1987 Lenhardt .................... 156/556
4,778,504 A * 10/1988 Kulla ............................ 65/58
4,911,779 A * 3/1990 Lenhardt .................... 156/556
4,972,938 A 11/1990 Lisec
5,051,145 A * 9/1991 Lenhardt ...................... 156/99
5,573,618 A * 11/1996 Rueckheim ................. 156/104
5,609,717 A * 3/1997 Pascale et al. ............... 156/556
5,626,712 A * 5/1997 Lisec ......................... 156/497
5,676,782 A * 10/1997 Lisec ......................... 156/109

(Continued)

FOREIGN PATENT DOCUMENTS

DE 92 05 069 9/1992

(Continued)

*Primary Examiner*—Steven P Griffin
*Assistant Examiner*—Jodi Cohen

(57) ABSTRACT

The invention describes a method and a device for positioning insulating glass panes (24, 25) that are arranged in pairs one opposite the other in a vertical assembly and pressing device for insulating glass panes which is part of a production line for insulating glass panes, in which a first glass sheet (24) and a second glass sheet (25) carrying a spacer (27), intended for one insulating glass pane, are fed into the assembly and pressing device in upright position, standing on a horizontal conveyor and leaning against a first supporting device (1, 31), the assembly and pressing device comprising an arrangement consisting of two pressure plates (la, 2*a*) that can be transferred from a first position, in which they are inclined in opposite directions, to a second position in which they are positioned one in parallel to the other.

41 Claims, 16 Drawing Sheets

U.S. PATENT DOCUMENTS

| | | | | |
|---|---|---|---|---|
| 5,753,069 | A * | 5/1998 | Rueckheim | 156/382 |
| 5,762,739 | A * | 6/1998 | Lenhardt et al. | 156/109 |
| 6,378,586 | B1 * | 4/2002 | Lafond | 156/362 |
| 2003/0146066 | A1 * | 8/2003 | Ashton | 198/346.2 |
| 2003/0178127 | A1 * | 9/2003 | Lisec | 156/109 |
| 2004/0134605 | A1 * | 7/2004 | Katsubo | 156/304.1 |
| 2005/0178490 | A1 * | 8/2005 | McGlinchy | 156/64 |
| 2005/0247392 | A1 * | 11/2005 | Lisec | 156/109 |
| 2007/0175120 | A1 * | 8/2007 | Lenhardt | 52/204.62 |
| 2007/0175564 | A1 * | 8/2007 | Lenhardt | 156/104 |
| 2007/0295441 | A1 * | 12/2007 | Schuler | 156/109 |
| 2008/0236096 | A1 * | 10/2008 | Lenhardt | 52/786.1 |

FOREIGN PATENT DOCUMENTS

| | | | |
|---|---|---|---|
| DE | 42 12 256 | C2 | 6/1998 |
| DE | 197 04 880 | A1 | 8/1998 |
| EP | 0 615 044 | A1 | 3/1994 |
| EP | 0 615 044 | B1 | 7/1996 |
| EP | 0 857 849 | B1 | 3/2004 |

* cited by examiner

METHOD FOR POSITIONING SHEETS OF GLASS IN A VERTICAL ASSEMBLY AND PRESS DEVICE FOR INSULATING GLASS PANES

The present invention relates to a method having the features defined in the preamble of Claim 1 and to a device having the features defined in the preamble of Claim 8.

EP 0 615 044 A1 describes an assembly, gas-filling and pressing device for insulating glass panes comprising two pressure plates arranged in V form one opposite the other in their initial position so that they are inclined by a few degrees in opposite directions one relative to the other. A horizontal conveyor provided below each of the pressure plates consists of a line of rollers driven in synchronism, whose rotary axes extend perpendicularly to the pressure plate. The assembly, gas-filling and pressing device is part of a production line for insulating glass panes in which the first glass sheet and the second glass sheet, carrying a spacer, are fed into the assembly, gas-filling and pressing device by a horizontal conveyor moving through the production line, on which they are arranged in spaced upright positions, leaning against an inclined supporting device. That device is said to be "vertical" because the glass sheets are transported and assembled to an insulating glass pane in upright, rather than in horizontal position. The assembly and pressing device is preceded by a transportation device which comprises two supporting devices arranged in V form, similar to the arrangement of the pressure plates. A section of the horizontal conveyor, running through that conveyor device at the same level as the assembly, gas-filling and pressing device likewise consists of two lines of synchronously driven rollers extending one beside the other. That conveyor device transports two glass sheets, from which an insulating glass pane is to be produced, with a spacer arranged on one of the sheets, in paired arrangement and in V form into the assembly, gas-filling and pressing device where they are stopped in opposite, aligned positions near the forward ends of the pressure plates. They are then fixed on the pressure plates by suction. To this end, a plurality of openings distributed over the pressure plates are connected with a blower. The openings in the pressure plates permit air to be selectively drawn in or blown out. When glass sheets are moved along the pressure plates, air is blown through the openings so that an air cushion forms between the pressure plates and the glass sheets which permits the glass sheets to slide. When the glass sheets are to be fixed, the system is switched over from blowing to suction. Once the glass sheets adhere firmly to the pressure plates, the two roller lines of the horizontal conveyor are moved away from the pressure plates, and the pressure plates are brought into a vertical position and are approached one to the other until a gap of a predefined width remains between the one glass sheet and the spacer on the opposite glass sheet. The vertical forward portion of the gap is sealed by suspended sealing means that can be introduced between the pressure plates from the rear and can be displaced in horizontal direction. A gas filling beam, rising from below, applies itself tightly to the lower edge of the pressure plates and the glass sheets, for sealing the lower portion of the gap. Then a heavy gas is introduced from below, which rises between the two glass sheets. Once the heavy gas has displaced the air from the space between the two glass sheets, the pressure plates are approached one to the other until the space between them corresponds to the thickness of the insulating glass pane to be produced, whereby the insulating glass pane is closed and pressed. Thereafter, the gas filling beam is lowered again, the suspended sealing devices are moved back to their initial positions, suction is released on one of the two pressure plates, and the two pressure plates are moved back to their initial positions in V form, during which process the insulating glass pane is entrained by one of the pressure plates. The two lines of driven rollers are moved back to their initial positions at the lower edge of the pressure plates. The pressure plate, against which the insulating glass pane rests, is switched over from suction to blowing so that an air cushion is once more formed on which the insulating glass pane is then transported out of the press.

The great number of operations to be carried out in the assembly, gas-filling and pressing device make that device the slowest station of the production line for insulating glass panes and determine its cycle time, thereby limiting the capacity of the system.

In order to increase the capacity of an assembly, gas-filling and pressing device, it has already been known from DE 42 12 256 C2 to configure a device of that type in such a way that two insulating glass panes can be filled with gas, assembled and pressed simultaneously. The known device is provided for this purpose with a first stationary inclined pressure plate, configured as an air-cushion wall, with two movable pressure plates of half its size provided one beside the other in parallel arrangement opposite such wall. The two smaller pressure plates are configured as suction plates. The operation of that known device differs considerably from the device known from EP 0 615 044 A1: The first glass sheet for the first insulating glass pane is placed on a horizontal conveyor formed from a line of driven rollers and located at the lower edge of the stationary pressure plate, is transported into the device and is stopped near the forward edge of the stationary pressure plate. The forward one of the two movable pressure plates is moved against the glass sheet, the latter is attached to it by suction and is then lifted off the horizontal conveyor and the stationary pressure plate. The second glass sheet, intended for the production of the first insulating glass pane and carrying a spacer, is then conveyed into the device and is placed in registration with the first glass sheet. These operations are repeated for the two glass sheets from which the second insulating glass pane is to be produced, except that these glass sheets are positioned near the rear end of the stationary pressure plate and that the lifting-off movement is carried out by the rear small pressure plate. Suction systems provided on the two movable pressure plates then slightly bend up the forward or rear edges, respectively, of the two glass sheets attached to them and approach the glass sheets to the stationary pressure plate until they are in contact with the opposite spacer, except for the points where they have been bent up. Then heavy gas is introduced through the remaining open gap between the respective pair of glass sheets. Once the air between the glass sheets has been displaced by the heavy gas, the bent-up portions of the glass sheets are restored to their original shape whereby the insulating glass panes are closed. They are then pressed and transported out of the system by the horizontal conveyor, in upright position.

Apart from the fact that the press is very complex, in technical terms, the gain in cycle time achieved by the possibility to fill two insulating glass panes simultaneously with heavy gas is balanced out to a considerable degree by the fact that more time is needed for positioning the four glass sheets in the assembly, gas-filling and pressing device than would be required in a device of the kind known from EP 0 615 044 A1.

EP 0 857 849 A2 discloses a method and a device for assembling and pressing insulating glass panes where the glass sheets for two insulating glass panes are placed in pairs one opposite the other already before they enter the assembly and pressing device, for being simultaneously conveyed into the assembly and pressing device one after the other. The glass sheets are in this case aligned in parallel one to the other from the very beginning and are placed in the same inclined position which is typical for vertical production lines. However, as the different glass sheets initially have to be approached one to the other, there will be required for this purpose either a turntable or a transversely movable feeder stage with separate conveyor and supporting means for the glass sheets arranged in parallel one to the other. This requires considerable apparatus input. Moreover, an additional supporting device for one of the two glass sheets of each pair of glass sheets is required also between the pressure plates in the assembly and pressing device, and that additional supporting device must be removed from the space between the pressure plates prior to closing and pressing the insulating glass panes. Further, both the turntable and the press, with its two movable pressure plates arranged in series one behind the other, cannot assemble more than two insulating glass panes at the same time. Because of its disadvantages, the device known from EP 0 857 849 A2 has not made its way in practice.

Now, it is the object of the present intention to show a way how the cycle time and, thus, the capacity of a production line for insulating glass panes, comprising a device for assembling and pressing insulating glass panes that simultaneously is adapted for filling in gas, can be improved at little expense and how the production costs of insulating glass panes can be reduced without any loss in quality of the insulating glass panes.

This object is achieved by a method having the features defined in claim 1 and by a device having the features defined in claim 8. Advantageous further developments of the invention are defined in the sub-claims.

According to the invention, the glass sheets for two or more than two insulating glass panes are placed on a track of the horizontal conveyor, which is located upstream of the assembly and pressing device, in paired V arrangement one opposite the other and in successive pairs, and are then fed together and in synchronism into the assembly and pressing device, where they are stopped.

The invention provides essential advantages:

The operation of positioning two or more than two sheet-pairs on a second track of the horizontal conveyor, upstream of the assembly and pressing device, is carried out while an assembling and pressing operation and, if desired, also a gas-filling operation is carried out in the assembly and pressing device.

Due to the fact that the pairs of glass sheets are positioned in V form, are transferred in that arrangement into the assembly and pressing device and are brought into parallel alignment in that device, the technical input can be considerably reduced compared with EP 0 615 044 A1 and EP 0 857 849 A2, and especially no rotatable or displaceable conveyor tracks and no additional supporting devices are required between the pressure plates and the assembly and pressing device.

The operation of conveying the glass sheet blanks, which are positioned on the second track of the horizontal conveyor, into the assembly and pressing device does not take more time than would be required for transferring a single pair of glass sheets into the assembly and pressing device.

The time required for positioning at least one pair of glass sheets can be saved-compared with the prior art.

As the pairs of glass sheets are fed into the assembly and pressing device in synchronism, their position one relative to the other does not get lost.

The invention is applicable to both the production of insulating glass panes that are filled with a heavy gas and the production of insulating glass panes that contain ordinary air.

The device according to the invention can be used not only for transferring pairs of glass sheets synchronously into the assembly and pressing device, to fill them there with a heavy gas and to assemble and compress them, but also for filling with gas, assembling and pressing a single insulating glass pane, especially one of extraordinary length. In any case, it is preferred to place as many pairs of glass sheets in close succession one behind the other in the assembly and pressing device as it can accommodate without the last glass sheet pair projecting beyond the rear end of the assembly and pressing device. Whenever the terms “forward” and “rear” are used in this context, they always relate to the conveying direction of the horizontal conveyor. In this sense, the rear end of the assembly and pressing device is the end where the pairs of glass sheets are fed into the assembly and pressing device.

The additional apparatus input required for arranging two or more than two glass sheets in pairs one opposite the other and one behind the other already upstream of the assembly and pressing device is comparatively small because the operation to be carried out upstream of the assembly and pressing device is a mere positioning operation that can be carried out using components and assemblies that normally are anyway used in production lines for insulating glass panes, such as horizontal conveyors on which glass sheets can be conveyed in upright position, supporting devices such as frames carrying a field of free-wheeling rollers, or an air-cushion wall against which the glass sheets can lean while placed in upright position on the horizontal conveyor, and finally means for transferring a glass sheet from an inclined supporting device to an oppositely arranged supporting device, which is inclined in opposite direction and which in the simplest of all cases may consist of an air-cushion wall, a plate comprising an arrangement of holes through which air can be selectively blown using an air blower to produce an air cushion between the wall and a glass sheet leaning against it, on which the glass sheet is permitted to slide during transportation, or through which air can be sucked, whereby a glass sheet leaning against the plate is attracted by suction and fixed in its position. Another possibility consists in supplementing a supporting device, which comprises a field of free-wheeling rollers, or by suction elements that can be moved in planes extending transversely to the conveying direction so that they can be applied to a glass sheet and can be firmly attached thereto for then entraining the sheet.

The way in which pairs of glass sheets are positioned upstream of the assembly and pressing device and are then transferred to the latter in synchronism, does not restrict the possibilities of filling insulating glass panes with a gas different from air, and of assembling and pressing them in the assembly and pressing device.

Most favorably, the glass sheets, having been transferred into the assembly and pressing device, are brought into parallel positions, one relative to the other, by a pivotal movement of one of the two pressure plates, are then further approached one to the other by parallel displacement of the movable pressure plate until a small spacing is reached at which a gap of, for example, 2 mm to 6 mm width remains between the respective spacer and the opposite glass sheet, which gap is still sufficient for filling in the gas. After suitable seals have been arranged at the forward edge of the first pair of glass sheets in the row and at the rear edge of the last pair of glass sheets in the row in the assembly and pressing device, it is then possible to fill the space between the pairs of glass sheets with a heavy gas, which will rise from the bottom to the top, and to then close and press the insulating glass panes by further parallel displacement of the movable pressure plate toward the fixed pressure plate.

An especially advantageous way of filling insulating glass panes with heavy gas in an assembly and pressing device is described in PCT Patent Application WO 2005/080739 A1 entitled "Method and device for assembling insulating glass panes filled with a gas different from air", which has been filed the same day by the same applicant, which is attached hereto and to which reference is herewith expressly made. Combining the two inventions provides particular advantages:

- The invention is especially well suited for the production of insulating glass panes of standard dimensions. The greatest part of all insulating glass panes have a length of not more than 1 m. Compared with this, an assembly and pressing device mostly has a length of 4 m or even more in order to be capable of mechanically producing even very big insulating glass panes. For example, one then places four insulating glass panes of equal thickness and of a length of up to 1 m, and of equal or different heights, together in such an assembly and pressing device, for being filled with a gas different from air, for being closed and pressed. The gain in productivity that can be achieved in this way is enormous.
- Existing production lines for insulating glass panes can be retrofitted according to the invention, whereby their productivity can be substantially improved at comparatively low expense.

The device according to the invention is intended to be part of a production line which comprises a horizontal conveyor subdivided into several tracks that can be driven separately. That device is suited for carrying out the method according to the invention. It comprises, upstream of an assembly and pressing device, a first track of the horizontal conveyor with two associated supporting devices that are inclined in opposite directions, namely a first supporting device for transporting the two glass sheets required for an insulating glass pane into the system, with the glass sheets leaning against the device, and a second supporting device against which the glass sheet arriving at first, which does not carry a spacer, comes to lean after transfer in a direction transverse to the conveying direction. Between the first track of the horizontal conveyor and the assembly and pressing device, there is provided a second track of the horizontal conveyor with two additional supporting devices inclined in opposite directions which need not be, and in fact are not, movable. The pairs of glass sheets that are to be transferred into the assembly and pressing device together and in synchronism, are placed on that second track of the horizontal conveyor in close succession in V arrangement one opposite the other. The second track of the horizontal conveyor therefore preferably has the same length as the pressure plates of the assembly and pressing device. The first track of the horizontal conveyor in contrast may be shorter than the second track and the third track of the horizontal conveyor extending in the assembly and pressing device. Preferably, the first track has a length equal to half the length of the pressure plates. This still allows handling of the largest glass sheets that can be assembled to insulating glass panes in the assembly and pressing device, as contrary to the conditions existing during the gas-filling and pressing operations, the glass sheets may project beyond the station in which they are to be positioned during the positioning operation.

For purposes of the invention, horizontal conveyors with different conveyor elements may be used. The conveyor elements may, for example, consist of rollers that can be driven in synchronism or of chains equipped with supporting elements, preferably with belts, especially toothed belts. Preferably, at least one of the horizontal conveyor tracks comprises conveyor elements on which both glass sheets intended for one insulating glass pane are transported, with the sheets standing upright in V form one opposite the other on the same conveyor elements. This ensures the best possible synchronism of the movement of two glass sheets placed in registration one opposite the other. This is important in order to guarantee that the aligned position given to the glass sheets on the first track of the horizontal conveyor will remain intact during transfer to the second and, finally, to the third track of the horizontal conveyor, without any need to place the pairs of glass sheets against predefined stops, which would result in considerable additional expense caused by the operation of positioning a plurality of pairs of glass sheets of varying formats in close succession one behind the other.

However, there is also the possibility to use separate conveyor elements for oppositely arranged glass sheets provided these can be driven in synchronism. This may be effected, for example, in the case of a roller conveyor by an arrangement where pairs of rollers arranged one beside the other are seated on one and the same drive shaft. A different possibility is the use of two toothed belts, arranged one beside the other, as conveyor elements that are driven by gears seated on one and the same shaft.

According to an especially preferred solution, a belt is used as a conveyor element in all three tracks of the horizontal conveyor of the device according to the invention, which belt must be supported to prevent sagging, for example by a series of rollers or a guide rail. The two glass sheets belonging to a glass sheet pair can be transported on such a belt in opposite positions whereby slippage is prevented with particular reliability and optimum synchronism between the glass sheets is achieved.

Preferably, the first track and the second track, as well as the second track and the third track of the horizontal conveyor can be driven and stopped independently one from the other. This is of particular advantage with a view to achieving short cycle times. Preferably, the procedure is such that a pair of glass sheets, placed one opposite the other on the first track of the horizontal conveyor, is transferred to the second track of the horizontal conveyor as early as possible, for which purpose both sheets are driven in synchronism for a short period of time. Preferably, the glass sheet pair is placed on the second track of the horizontal conveyor in a position in which the rear edges of the glass sheets stop in the direct neighborhood of the rear end of the second track. As the glass sheet pair is being transferred to the second track, the first glass sheet of the next glass sheet pair may already enter, and be positioned, in the first track of the horizontal conveyor and may then be transferred to its oppositely inclined position. If a single conveyor element only or conveyor elements arranged one beside the other, which can be driven only jointly, are available for both glass sheets of one pair, then the first glass sheet of a glass sheet pair is lifted off the horizontal conveyor during transfer to its oppositely inclined position and is held in an intermediate position before it is again placed on the horizontal conveyor. While the sheet is in its intermediate position, the second glass sheet, carrying a spacer, may enter the first track of the horizontal conveyor and may be positioned on the latter in exact registration to and opposite the first glass sheet.

Thereafter, the first glass sheet can be transferred again from its intermediate position to its envisaged initial position in which it is inclined in a direction opposite to the direction of the second glass sheet and in which it will again be placed on the horizontal conveyor. For this purpose, use is preferably made of a movable supporting device in the form of a plate to which the first glass sheet can be attached by suction, in the area of the first track of the horizontal conveyor. The plate preferably can be rotated about an axis extending in parallel to the conveying direction, below the horizontal conveyor.

The operations of forming oppositely arranged glass sheet pairs on the first track of the horizontal conveyor and of transferring those glass sheet pairs to the second track of the horizontal conveyor is preferably repeated so long as the row of glass sheet pairs formed on the second track of the horizontal conveyor does not get longer than the pressure plate. For forming that row, the glass sheet pairs positioned on the second track of the horizontal conveyor preferably are advanced in each case by a distance only slightly greater than the length of the next following glass sheet pair in order to keep the distance between the glass sheet pairs on the second track of the horizontal conveyor and, correspondingly, in the assembly and pressing device as small as possible. When a glass sheet pair is positioned on the first track of the horizontal conveyor, which cannot be accommodated any more on the second track of the horizontal conveyor, it is retained in the first track of the horizontal conveyor until the current assembling and pressing operation is completed and the assembly and pressing device has opened again so that removal of the insulating glass pane just assembled can be initiated. The glass sheet pairs, that have been accumulated on the second track of the horizontal conveyor, can then be transferred into the assembly and pressing device, and simultaneously the next glass sheet pair can be transferred from the first track of the horizontal conveyor to the second track of the horizontal conveyor and can be positioned in the latter so that its rear edge comes to lie in the neighborhood of the rear edge of the second track. The rear end of the second track of the horizontal conveyor may be equipped for this purpose with a position sensor which responds to the glass sheets and which stops the drive of the second track of the horizontal conveyor as soon as the rear edges of the glass sheets reach the position sensor.

Conveniently, the first supporting device, against which the glass sheets lean when entering the system, are immovable in the area of the first track of the horizontal conveyor. In the area of the second track of the horizontal conveyor, those supporting devices preferably are immovable in their V position. In the assembly and pressing device, one of the two pressure plates conveniently is immovable in its position as well. The second movable pressure plate and the movable supporting device in the first track of the horizontal conveyor conveniently have an initial position in which they are aligned with the corresponding pressure plate in the second track of the horizontal conveyor.

The plate preferably provided as a movable pressure plate in the first track of the horizontal conveyor is provided with openings through which air can be selectively blown or sucked by a blower. That plate can be approached to the first supporting device, arranged opposite the plate, and can be aligned with the latter, which preferably can be achieved by the fact that the plate can be rotated about a pivot axis extending in parallel to the conveying direction of the horizontal conveyor, and can also be displaced in parallel to itself at a right angle to the conveying direction, the pivot axis preferably being arranged at a level lower than the level of the horizontal conveyor. This provides the advantage that a glass sheet, which has to be transferred from one inclined position into the oppositely inclined position, can be lifted off the conveying surface of the horizontal conveyor for this purpose without any difficulty. This is of particular importance because the conveyor elements of the horizontal conveyor usually have a surface made from a resilient plastic material, especially a polyurethane known under the trade name Vulkollan, into which the sharp edges of the glass sheets will impress a little so that transfer of the sheets by transverse displacement would be difficult or even impossible.

According to an especially favorable solution, the transfer of the glass sheet from the one inclined position to the oppositely inclined position is effected by combining a pivotal movement with a linear parallel displacement of the glass sheet, which provides greater freedom with respect to the selection of the position of the pivot axis and allows easier handling of glass sheets of different thicknesses.

The motion sequence of the plate preferably provided in the first track of the horizontal conveyor is equally well suited for the movable pressure plate in the assembly and pressing device because there a straight parallel displacement of the movable pressure plate is anyway required in order to permit the insulating glass pane to be closed and pressed in parallel once the two pressure plates have reached a parallel position one relative to the other.

In the area of the first track of the horizontal conveyor, the position of the pivot axis of the movable plate, preferably provided in that area, advantageously is selected to permit the glass sheet, that has been picked up by it from the immovable supporting device and has been transferred to an oppositely inclined position, still has a small distance from the transporting surface of the horizontal conveyor in the initial position of the movable plate so that no friction will occur between the sharp lower edge of the glass sheet and the transporting surface of the horizontal conveyor that could hinder its movement into its initial position. Once the movable plate has again reached its initial position, fixing the glass sheet by suction can be ended so that the sheet is permitted to slide down along the plate onto the horizontal conveyor-such movement being absolutely unproblematic in view of the spacing that preferably does not exceed 2 mm.

The upper tangential planes of the conveyor elements of the horizontal conveyor (the upside of the upper run in the case of a belt, the common upper tangential plane in the case of a line of rollers driven in synchronism) can be oriented at different angles relative to the supporting devices arranged in V form. Preferably, the angle enclosed between them in their oppositely inclined positions and the supporting devices arranged in V form, or between the sides of the two pressure plates facing each other in the assembly and pressing device, is greater than 90°. Most preferably, the tangential planes are horizontal and enclose with the two supporting device arranged in V form an angle of equal size greater than 90°. Preferably, each of the angles is 96°, which means that the supporting devices enclose between them an acute angle of 12°.

Preferred as a single conveyor element for each of the three tracks of the horizontal conveyor is a belt, especially a toothed belt. The belt preferably has a width of 100 mm to 120 mm in the first and the second tracks of the horizontal conveyor, and of 120 mm to 140 mm in the assembly and pressing device, which makes it easier to establish a sealing condition between the belt and the lower edge of the pressure plates when filling in a gas.

A particular advantage of the invention lies in the fact that it can be used also in existing vertical production lines for insulating glass panes, by retrofitting.

Certain embodiments of the invention are shown in the attached drawings, partially in diagrammatic form. Identical or corresponding parts used in the different drawings are designated by the same reference numerals.

Figure 1:
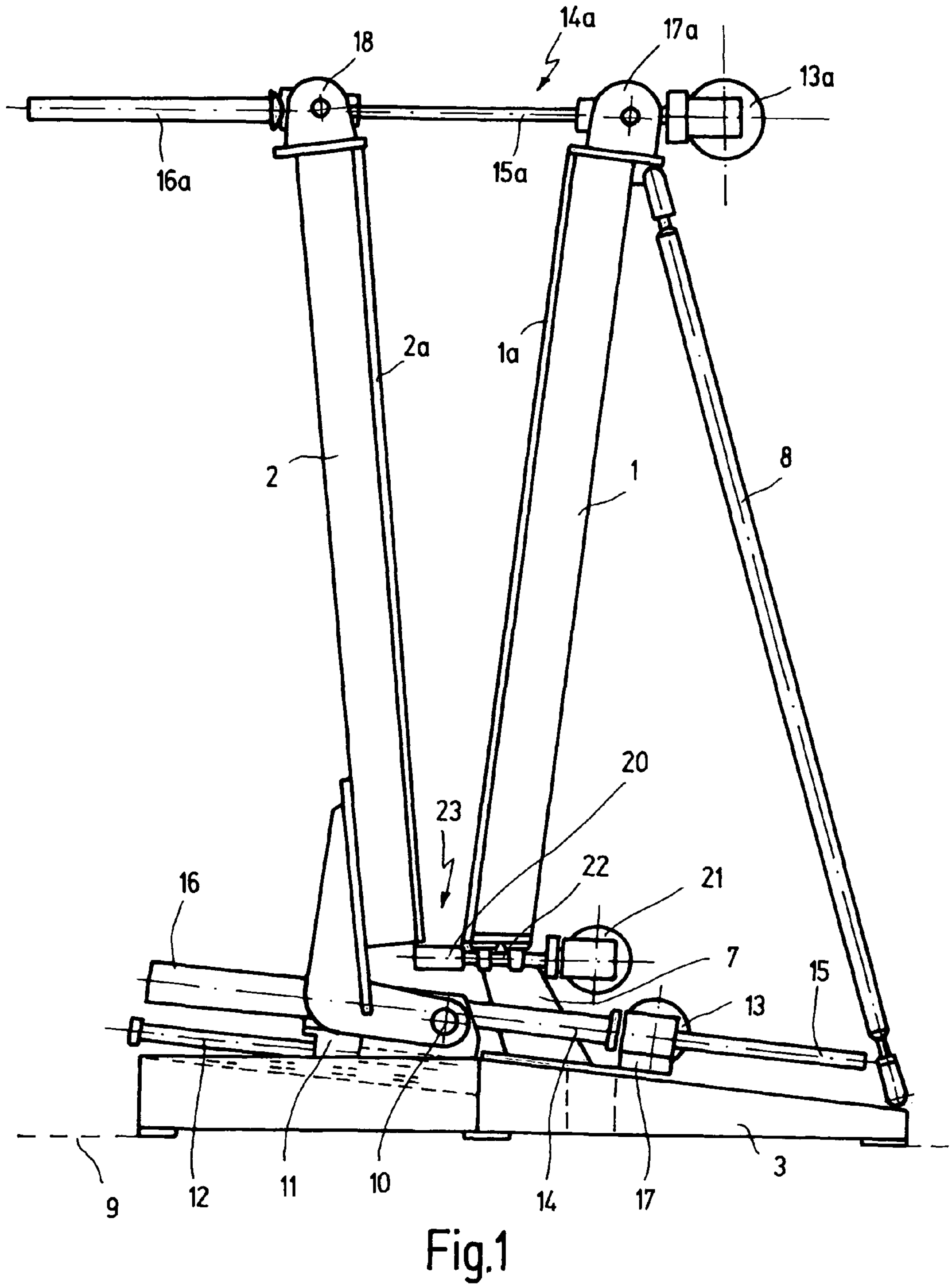
FIG. 1 shows a side view of a pairing station with supporting devices arranged in V form one relative to the other.

The pairing station illustrated in FIGS. 1 to 5 comprises two oppositely arranged supporting devices 1 and 2 provided on a frame 3. Each of the two supporting devices 1 and 2 comprises plates 1*a* and 2*a*, respectively, which are provided with passage holes 4 at many points distributed over the plates, which passage holes are covered by a hood 5 at the rear of the respective plate 1*a*, 2*a*, respectively, which hood is connected with a blower—not shown—by which air can selectively be blown into the chamber 6 formed below the hood 5, or be removed from the chamber 6 by suction.

The first supporting device 1 stands on a base 7 which is firmly connected with the frame 3; the rear of its upper end is supported on the frame 3 via struts 8. The arrangement is such that the plate 1*a* is inclined to the rear, relative to the vertical line, by an angle of 6°, for example. The horizontal floor on which the frame 3 is located is indicated by reference numeral 9.

Figure 2:
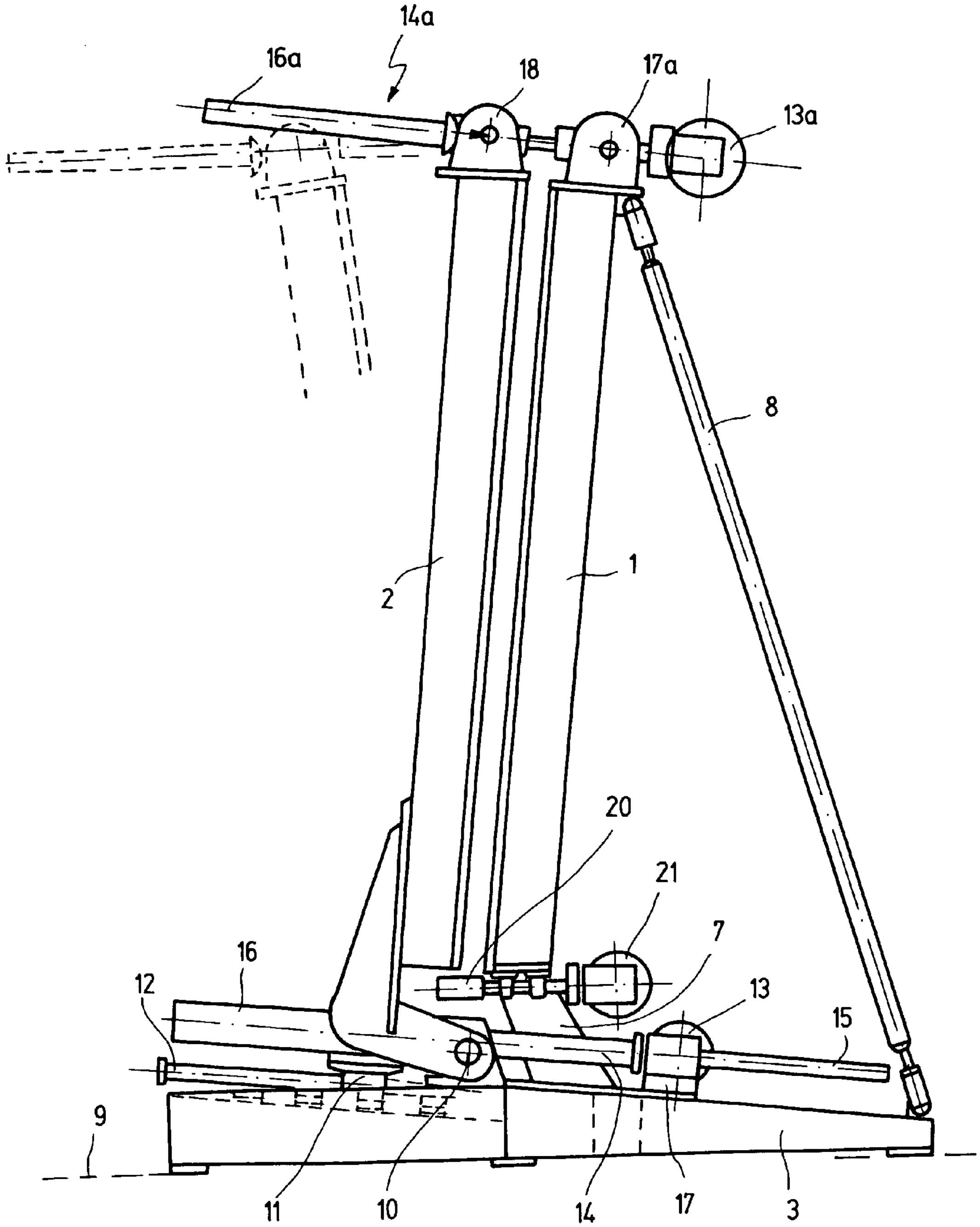
FIG. 2 shows a view of a that pairing station similar to FIG. 1, but with the supporting devices placed upright and in parallel one to the other.
Figure 3:
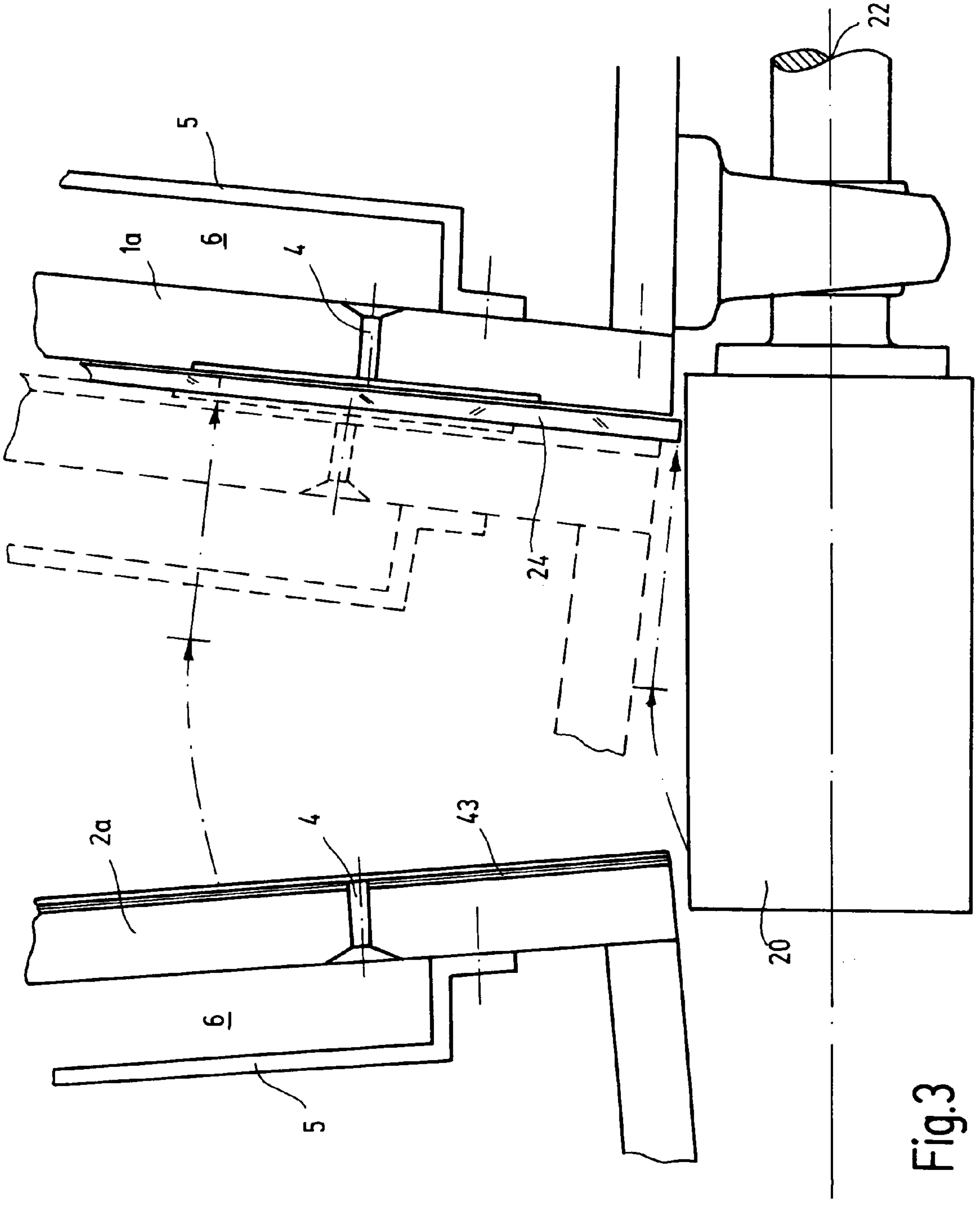
FIG. 3 shows a vertical section, enlarged relative to FIG. 1, through a detail of the lower area of the pairing station with its supporting devices arranged in V form and a glass sheetleaning against one of those devices.

The second supporting device 2 is mounted on a carriage 11 for pivotal movement about an axis 10 that extends perpendicularly to the drawing plane in FIGS. 1 and 2, the carriage being arranged for linear displacement along rails 12, which extend in vertical planes relative to the pivot axis, and which are inclined relative to the horizontal line 9 by the same angle by which the plate 1*a* is inclined relative to the vertical line. Accordingly, the carriage 11 can be displaced in a direction perpendicular to the plate 1*a*. Displacement of the carriage 11 is brought about by a motor 13 that drives a spindle 15 of a spindle gearing 14 whose spindle nut is located in a housing 16 and is connected with the carriage 11 for pivotal movement about a horizontal axis extending in parallel to the conveying direction. The spindle 15 is likewise seated in a holder 17 mounted on the frame 3, with its axis extending in parallel to the conveying direction.

The upper ends of the supporting devices 1 and 2 are connected one with the other by a further spindle gearing 14*a* whose spindle 15*a* is pivotally seated in a holder 17*a* mounted on the first supporting device 1 and is driven by a motor 13*a*. The associated spindle nut is accommodated in a housing 16*a* and is seated for pivotal movement in a holder 18 mounted on the movable supporting device 2. The spindle gearings 14 and 14*a* are provided in duplicate, preferably in the neighborhood of the four corners of the rectangular contour of the plates 1 and 2*a*.

By driving the spindles 14*a*, the second supporting device 12 can be pivoted from its initial position illustrated in FIG. 1, in which the plates 1*a* and 2*a* are arranged one opposite the other in V form at an angle of 12°, for example, into the intermediate position illustrated in FIG. 2 in which the movable plate 2*a* is arranged opposite and in parallel to the plate 1*a*, preferably at a spacing of 5 cm to 7 cm. From the intermediate position illustrated in FIG. 2, the movable supporting device 2 can then be further approached to the stationary supporting device 1, by synchronous activation of the lower and the upper spindles 15 and 15*a*, during which operation the parallel arrangement of the two elements remains unchanged.

A horizontal conveyor 20 mounted on the lower edge of the stationary supporting device 1 can be driven by a motor 21. The horizontal conveyor 20 is a first track of a horizontal conveyor, composed from a plurality of tracks, that extends through the entire production line in which the invention is to be implemented. The track may consist of a line of rollers having cylindrical lateral surfaces and mutually parallel horizontal rotary axes arranged between the two supporting devices 1 and 2, the widths of the rollers being sufficiently great—preferably 10 cm to 12 cm—to bridge the gap 23 existing in the initial position of the movable second supporting device 2 at the lower edge of the plates 1*a* and 2*a*. Due to the fact that the axes 22 of the rollers of the horizontal conveyor 20 extend in a horizontal plane, they enclose with the plates 1*a* and 2*a* identical angles of, for example, 96° in the initial positions illustrated in FIG. 1.

The horizontal conveyor 20 may be formed not only by a line of rollers that can be driven in synchronism, but also by a belt 20*a*, especially by a toothed belt, that can be driven by the motor 21 via a driving wheel, especially a gear. In order to prevent sagging, such a belt 20*a* is supported on a series of free-wheeling rollers or on a horizontal rail on which the upper run of the belt 20*a* is permitted to slide.

The pairing station can be supplied with separate glass sheets 24 and 25 by a feeder 26 which substantially consists of a horizontal conveyor aligned with the horizontal conveyor 20 and a supporting device the front of which is aligned with the front of the first supporting device 1 in the pairing station. The feeder 26 is illustrated diagrammatically in FIGS. 7 to 10.

In order to position two glass sheets 24 and 25 in registration and opposite one to the other, in V form, a first glass sheet 24 is initially transported by the feeder 26 into the pairing station where it is stopped in a predefined first position, in contact with the first supporting device 1, preferably in a position in which the forward edge of the first glass sheet 24 comes to lie near the forward end of the first immovable plate 1*a*. During the feeding motion, air is blown into the chamber 6 that exits through the holes 4 to produce an air cushion between the plate 1*a* and the first glass sheet 24, which permits the first glass sheet 24 to move at low friction during the feeding motion and which at the same time acts to hold the glass sheetin contact with the plate 1*a* due to the vacuum produced in the air cushion. Once the first glass sheet 24 has reached its predefined fist position, no further air is blown into the chamber 6.

Figure 4:
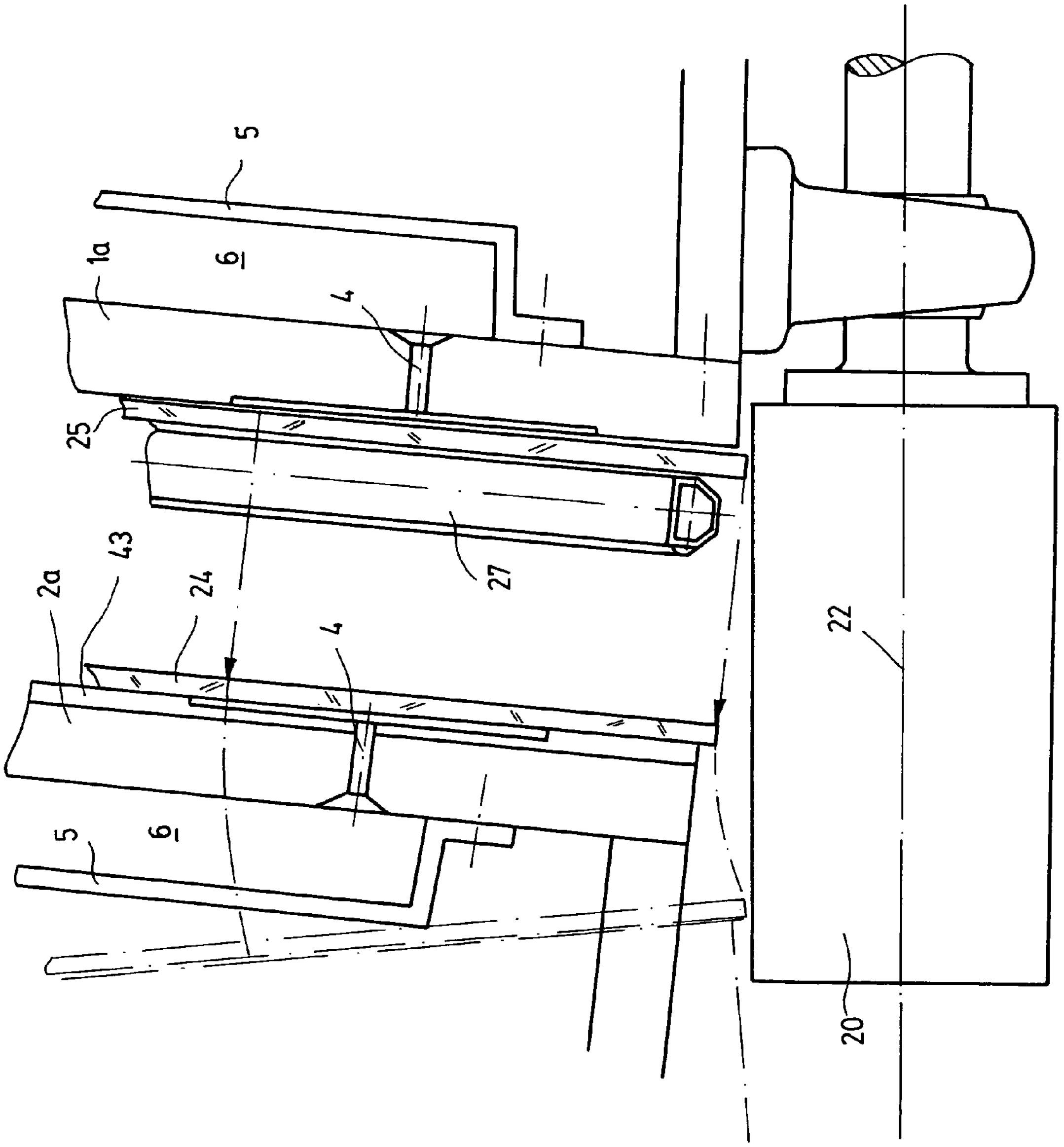
FIG. 4 shows a representation of the pairing station similar to that of FIG. 3, but with the supporting devices arranged in parallel one opposite the other, with a glass sheetin contact with both devices.
Figure 5:
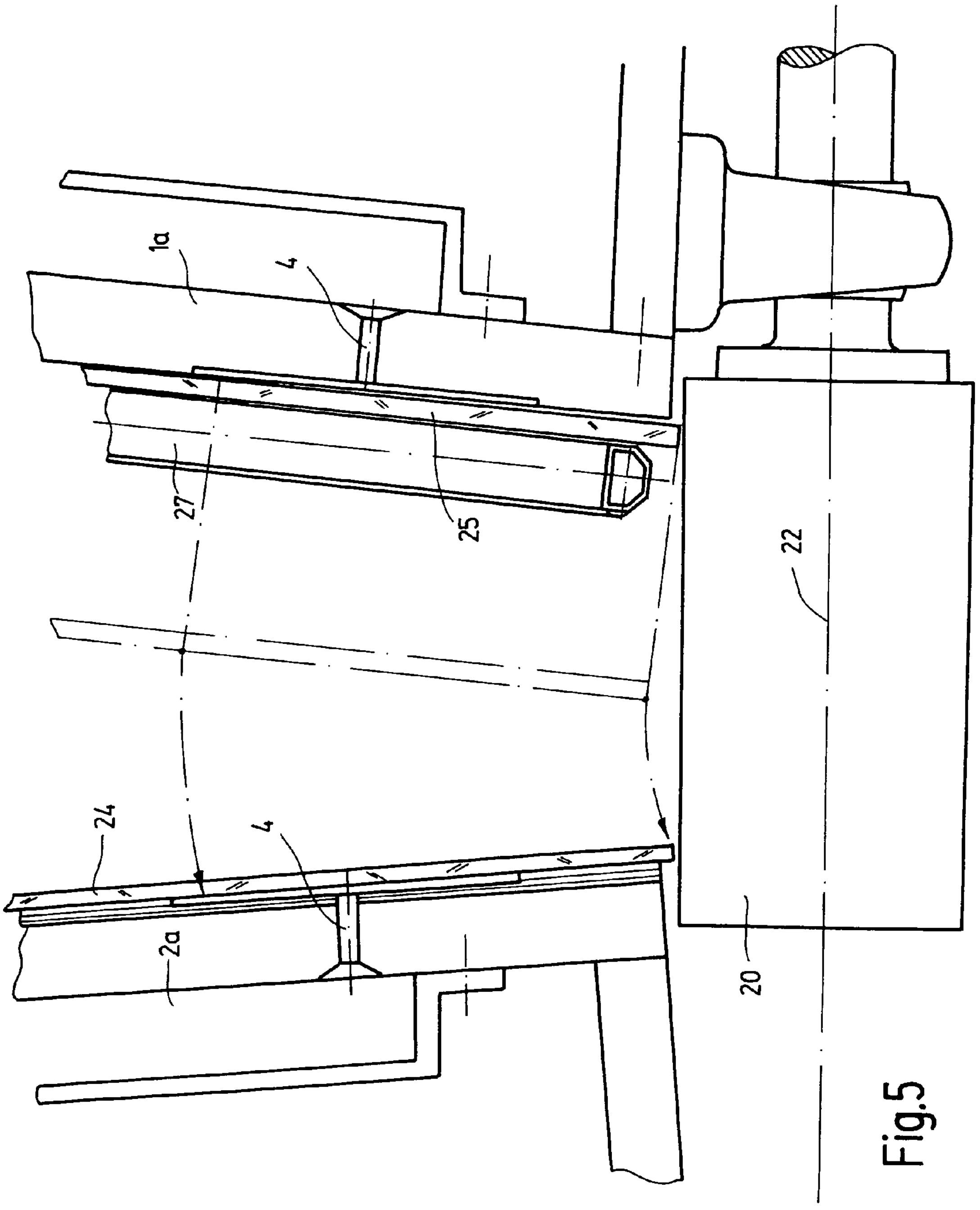
FIG. 5 shows a representation of the pairing station similar to that of FIG. 4, but with the supporting devices arranged in V form, in their initial position.

Now the second movable plate 2*a* of the supporting device 2 is initially pivoted into a parallel position relative to the first plate 1*a*, by activation of the spindle 15*a*, and is then displaced by synchronous activation of all spindles 15 and 15*a* in parallel to itself until it comes to hit against the first glass sheet 24. That motion sequence is illustrated by broken lines in FIG. 3. Thereafter air is extracted from the chamber 6 behind the movable plate 2*a*, whereby the first glass sheet 24 is firmly attached by suction to the plate 2*a* and is fixed on the latter. The spindles 15 and 15*a* are then driven in opposite direction, whereby the plate 2*a* is moved away from the stationary plate 1*a*, in parallel to itself. Due to the angle existing between the rail 12 and the horizontal line 9, the glass sheet 24 is lifted off the horizontal conveyor 20 during this motion at the same angle and is temporarily held in a lifted intermediate position, as illustrated in FIG. 4. Now, a second glass sheet 25, carrying a spacer 27, can be fed into the pairing station along the same track on which the glass sheet 24 had been fed into the pairing station, during which process the position of the first glass sheet 24 will remain unchanged; the second glass sheet is then stopped in the pairing station in the same first position in which the first glass sheet 24 had been stopped before. The two glass sheets 24 and 25 are now arranged in registration one opposite to the other—see FIG. 4. By driving the upper spindles 15*a*, the second movable plate 2*a* is now pivoted back to its initial position illustrated in FIGS. 1 and 3. The position of the pivot axis 10 and the pivoting angle are adjusted for this purpose to ensure that the first glass sheet 24 will not yet contact the horizontal conveyor when the second movable plate 2*a* has again reached its initial position. Once this has occurred, extraction of air from the chamber 6 behind the second movable plate 2*a* is stopped so that the first glass sheet 24 is no longer fixed in its position, but will slide down on the second plate 2*a* until it comes to rest on the horizontal conveyor 22 (see FIG. 5). The length of this sliding movement is, for example, 1 mm to 2 mm, a distance that is absolutely uncritical for the first glass sheet 24.

Figure 6:
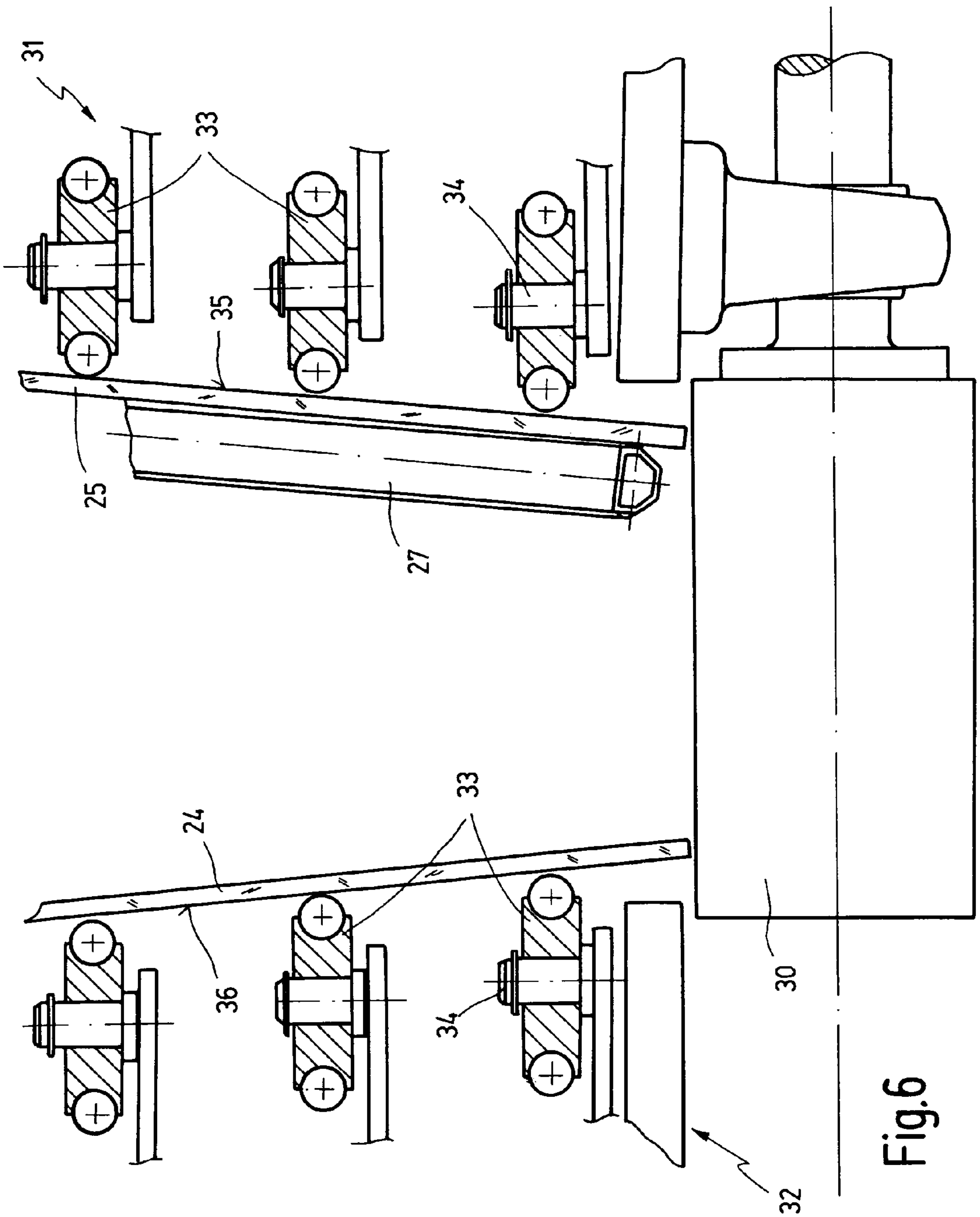
FIG. 6 shows a vertical section through the lower area of a buffer station provided downstream of the pairing station, as illustrated in FIG. 5.

Now, the two glass sheets 24 and 25 are arranged in registration and opposite one to the other in V form, with their outer lower edges resting on the horizontal conveyor 20. This completes the pairing operation for those two glass sheets 24 and 25. The two glass sheets 24 and 25 are now conveyed into a buffer station (see FIG. 8) downstream of the pairing station by activation of the horizontal conveyor 20. A section through part of the lower portion of the buffer station, taken at a right angle to the conveying direction, is shown in FIG. 6. In the illustration of FIG. 6, the conveying direction extends at a right angle to the drawing plane. The buffer station comprises a first supporting device 31 and a second supporting device 32, both of them being equipped with a field of free-wheeling rollers 33 with a vertical axis 34. The rollers 33 of the first supporting device 31 have a common tangential plane 35 and the rollers of the second supporting device 32 have a common tangential plane 36. The tangential planes 35 and 36 are inclined in opposite directions relative to the vertical line. The tangential plane 35 is aligned with the front of the first plate 1*a* in the pairing station. The tangential plane 36 is aligned with the front of the second plate 2*a* in the pairing station when the latter occupies its initial position illustrated in FIGS. 1, 3 and 5. The axes 34 of the rollers 33 are stationary so that the position of the tangential plates 35 and 36 does not change. A further horizontal conveyor 30, whose upper surface is aligned with the upper surface of the horizontal conveyor 20 in the pairing station and which can be configured in the same way as the latter, is arranged below the supporting devices 31 and 32. The horizontal conveyor 30 is a second track of the horizontal conveyor extending through the production line.

It should be noted that alternatively the first supporting device 1 located in the pairing station may be configured identically to the first supporting device 31 in the buffer station.

The horizontal conveyor 30 can be driven independently of the horizontal conveyor 20. By driving the conveyors in synchronism, the glass sheets 24 and 25 (FIG. 5), located one opposite the other in the pairing station, are fed into the buffer station (FIG. 6) and are positioned in that station in a predefined second position with the rear edges of the glass sheets 24 and 25 as close as possible to the rear end of the buffer station, as is illustrated in FIG. 7 for a pair of glass sheets D1/D2, by way of example.

Given the fact that the glass sheets 24 and 25 are inclined in opposite directions, instead of being placed vertically on the horizontal conveyors 20 and 30, they are supported on the respective horizontal conveyor 20, 30 by their outer lower edges. The sharp glass edges lead to good adhesion between the glass sheets 24 and 25 and the normally somewhat resilient surface of the horizontal conveyors 20, 30, which may for example consist of a polyurethane known under the trade name Vulkollan. As a result of the good adhesion effect, slippage between the glass sheets 24 and 25 and the horizontal conveyors can be excluded so that the glass sheets 24 and 25 will not get displaced one relative to the other during the feeding motion, but will retain their relative positions one to the other.

Figures 7, 8, 9, 10:
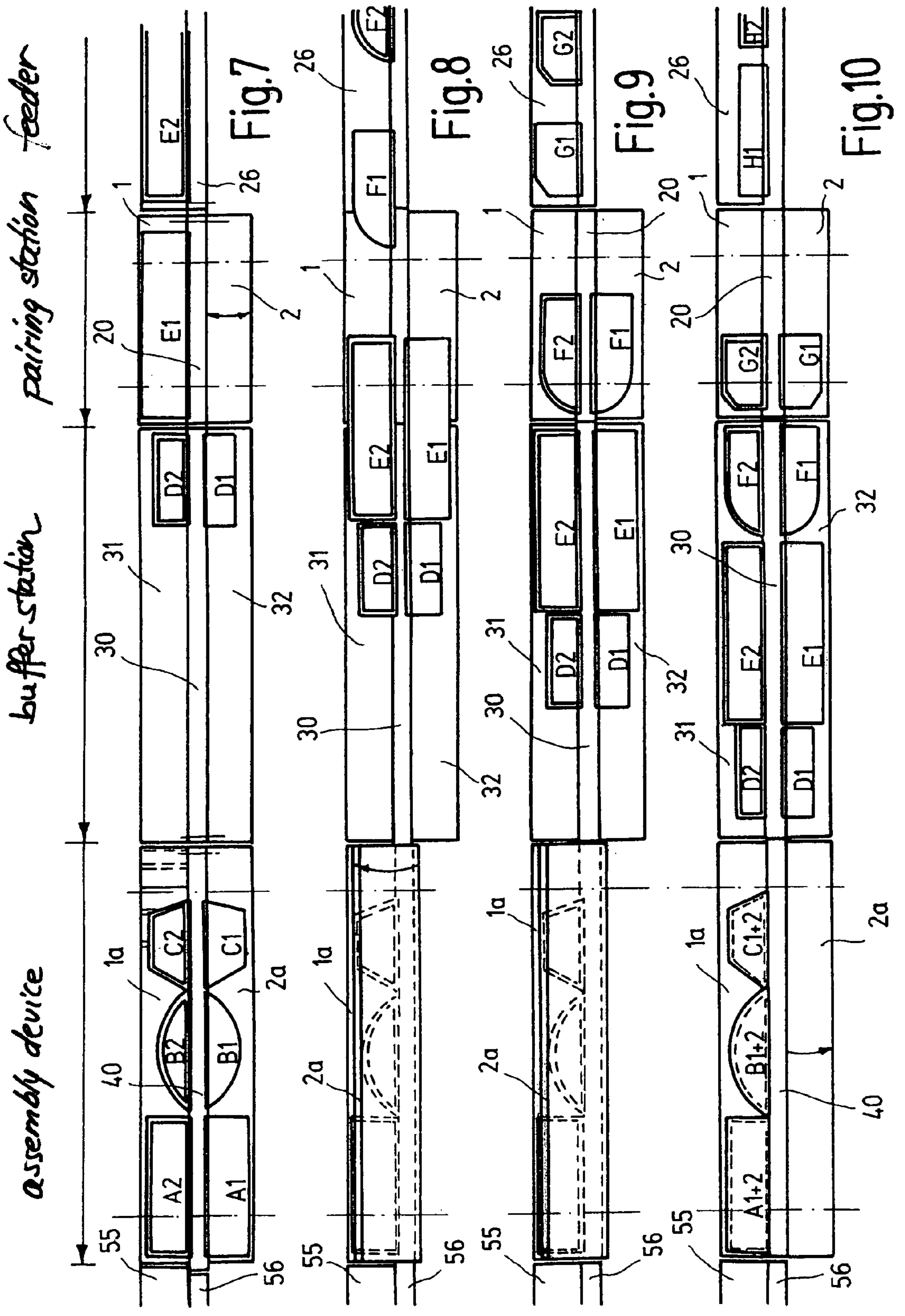
FIGS. 7 to 10 show a diagrammatic top view of a detail of a production line for insulating glass panes, illustrating successive phases of the production of insulating glass panes.

The operations of pairing the glass sheets, i.e. arranging one pair of glass sheets exactly opposite one to the other, and of transferring the glass sheet pair to a buffer station are repeated according to the invention until the buffer station can no longer accommodate any further glass sheet pairs, as is illustrated diagrammatically in FIGS. 7 to 10: FIG. 7 illustrates a point in time where a glass sheet pair D1/D2 has been positioned at the rear end of the buffer station. As the glass sheet pair D1/D2 is transferred into the buffer station, a next first glass sheet E1 may already be fed into the pairing station and may be positioned on the forward end of the first supporting device 31 by the feeder 26 (FIG. 7), before it is attached by suction to the second supporting device 32 in that position in the described way and transferred to the oppositely inclined position. Once this has been done, the second glass sheet E2, carrying a spacer 27, is then transported into and positioned in the pairing station in registration with and opposite to the glass sheet E1. Now, the glass sheet pair E1/E2 is transferred to the buffer station, while at the same time transportation of the glass sheet pair D1/D2 in the buffer station continues in order to make room for the next following glass sheet pair E1/E2 (see FIG. 8). While this process continues, the next first glass sheet F1 of the next following glass sheet pair F1/F2 may already be fed into the pairing station. In order to reduce the spacing between the glass sheet pair D1/D2 and E1/E2 from the spacing they still have in FIG. 7 to the smaller spacing they still have in the phase illustrated in FIG. 8, the drive of the horizontal conveyor 20 is switched on a little earlier than the drive of the horizontal conveyor 30. The drive of the horizontal conveyor 30 is stopped again when the rear edges of the glass sheet pair E1/E2 have passed the rear end of the buffer station so that the rear edges of the glass sheet pair E1/E2 assume the "second" position which the rear edges of the glass sheet pair D1/D2 occupied in the phase illustrated in FIG. 7—see FIG. 9. The drive of the horizontal conveyor 20 in the pairing station is switched off later when the forward edge of the next following glass sheet F1 has reached the forward end of the pairing station (see FIG. 9). The glass sheet pair F1/F2 is now paired, and once this is accomplished (FIG. 9), the glass sheet pair F1/F2 is transferred into the buffer station in the described way and is positioned in the buffer station in the "second" position in which the rear edges of the glass sheet pair F1/F2 come to lie at the rear end of the buffer station at the point where the rear edges of the glass sheet pair E1/E2 had been positioned before. There is now no room left in the buffer station for the next following glass sheet pair G1/G2. The glass sheet pair G1/G2 can be transferred into the buffer station only when feeding of the glass sheet pairs D1/D2, E1/E2 and F1/F2 into the assembly and pressing device begins. During the phase in which the buffer station was filled with the glass sheet pairs D1/D2, E1/E2 and F1/F2, three preceding glass sheet pairs A1/A2, B1/B2 and C1/C2 have been positioned in the assembly and pressing device downstream of the buffer station for being filled with heavy gas, have been filled with heavy gas and have been closed and pressed to form the final insulating glass panes.

Basically, the structure of the assembly and pressing device resembles the structure of the pairing station so that the description of the structure of the pairing station given with reference to FIGS. 1 to 5 likewise applies to the assembly and pressing device. The systems are different insofar as the assembly and pressing device is longer than the pairing station, namely so long that it is capable of receiving all the glass sheet pairs accommodated in the buffer station. Thus, the buffer station and the assembly and pressing device are adapted in length one to the other. Another difference consists in that the assembly and pressing device is equipped with devices for supplying the heavy gas, with a view to the gas-filling operation, and with sealing means with a view to preventing losses of heavy gas. This will be described hereafter with reference to FIGS. 11 to 18. In view of the largely analogous structure of the pairing station and the assembly and pressing device, corresponding parts are designated by corresponding reference numerals. In view of their task, namely to press the insulating glass panes, the structure of the pressure plates may be stiffer than the structure of the plates 1*a* and 2*a* in the pairing station.

Figure 11:
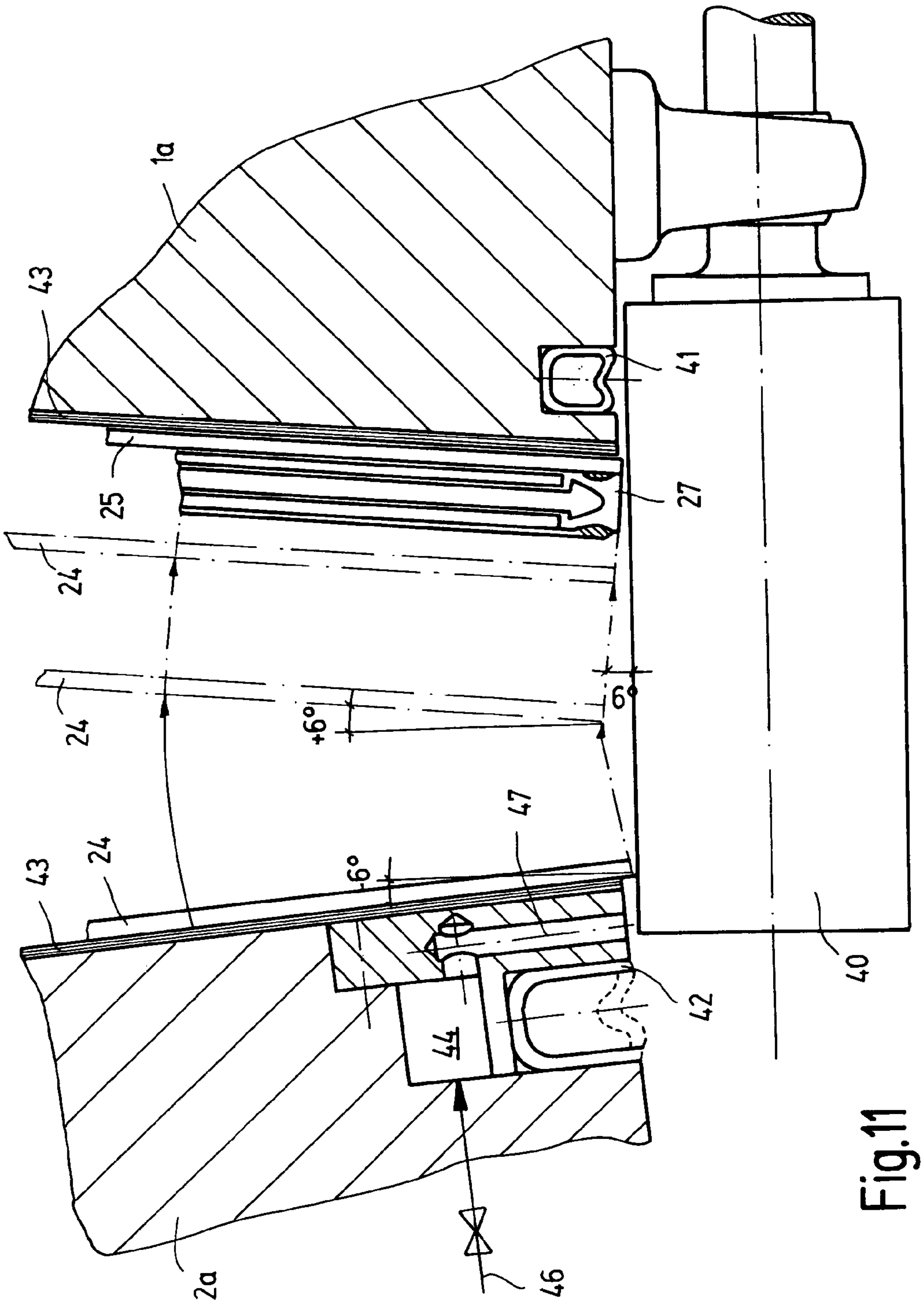
FIG. 11 shows a vertical cross-section, corresponding to FIG. 5, through the lower area of a device for assembling, gas-filling and pressing insulating glass panes, with the pressure plates in their initial position in V form.

The pressure plates 1*a* and 2*a* in the assembly and pressing device, and also the corresponding plates 1*a* and 2*a* in the pairing station are provided with holes through which air can be selectively blown to produce an air cushion on which the glass sheets can slide while being transported, or extracted in order to fix the glass sheets on the plates. These openings are not shown in FIGS. 11 to 18 for reasons of clarity. The sides of the pressure plates 1*a* and 2*a* that face each other are provided with a layer 43 of rubber or another elastomeric material. The layer may have a thickness of 3 mm to 4 mm, for example. In the pressure plates 1*a* and 2*a*, which are aligned with the stationary plate 1*a* of the pairing station or with the movable plate 2*a* of the pairing station in their initial positions, a hose 41 or 42, respectively, is provided in a longitudinal groove arranged in the lower edge of the pressure plates 1*a* and 2*a*, which hose can be selectively evacuated or blown up. In the evacuated condition, it has no contact with the horizontal conveyor 40, as is illustrated in FIG. 11. The horizontal conveyor 40 in the assembly and pressing device comprises a conveyor element in the form of a belt 40*a*, especially a toothed belt, which closes the gap between the two glass sheets 24 and 25 and which also seals the space between the belt 40*a* and the hoses 41 and 42 in the two pressure plates 1*a* and 2*a*. The hose 42 extends substantially over the full length of the pressure plates 1*a* and 2*a*. As will be explained hereafter, the hose 41 may be subdivided into separate sections.

Figure 12:
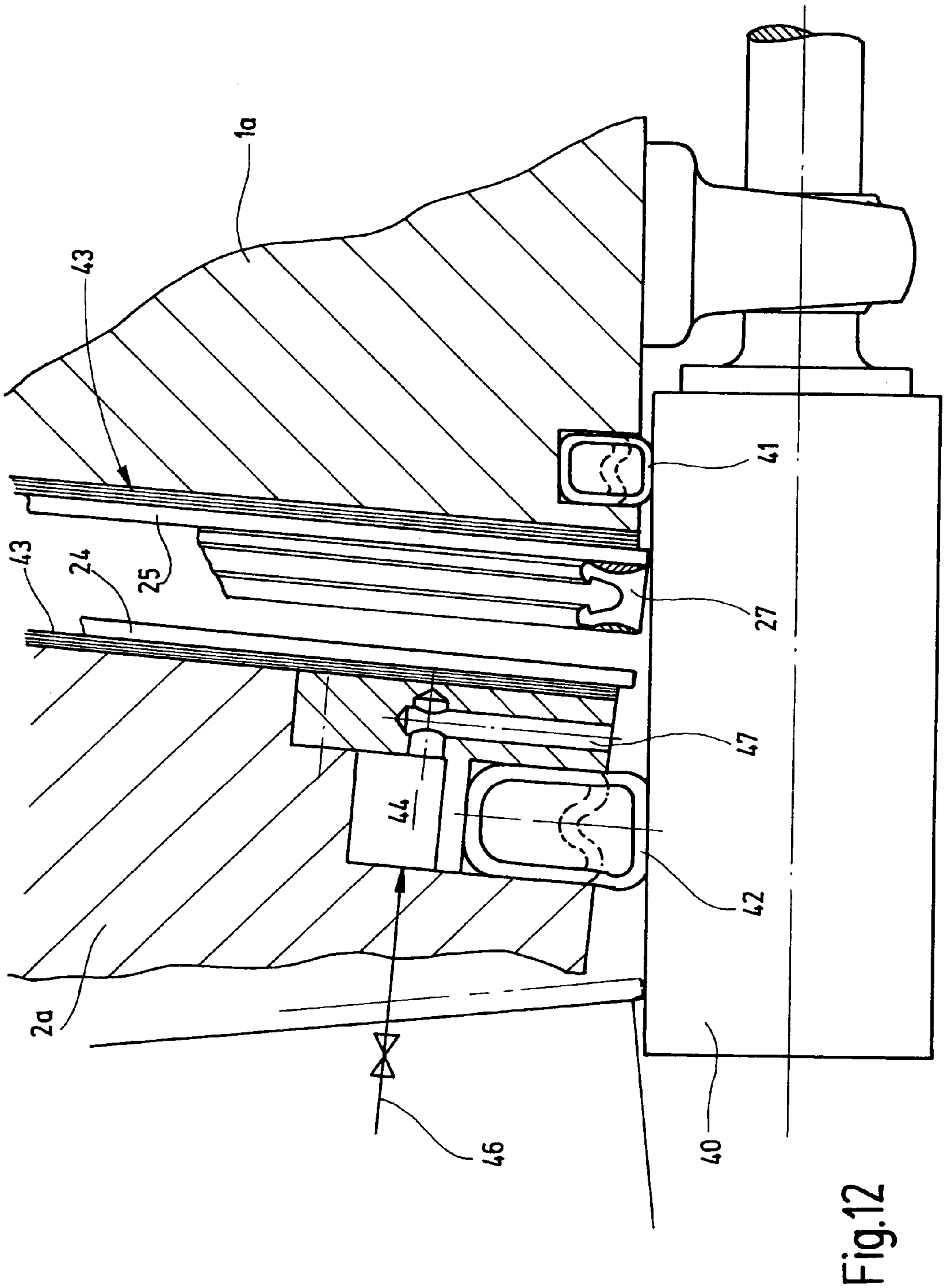
FIG. 12 shows a section, corresponding to FIG. 11, through the device for assembling, gas-filling and pressing insulating glass panes, but with the pressure plates standing upright one parallel to the other, with the insulating glass panes not yet closed, in the gas-filling phase.

A horizontal channel 44, arranged behind the hose 42, is subdivided into separate sections by partition walls 45—see FIG. 12. The sections of the channel 44 can be supplied with a gas different from air through supply lines 46 that can be shut off separately. At least one branch duct 47, preferably a longitudinal slot, or a series of branch ducts lead from each section of the channel 44 in downward direction, ending at the lower edge of the movable pressure plate 2*a* in the area between the hose 42 and the rubber layer 43—see FIG. 11.

Figure 13:
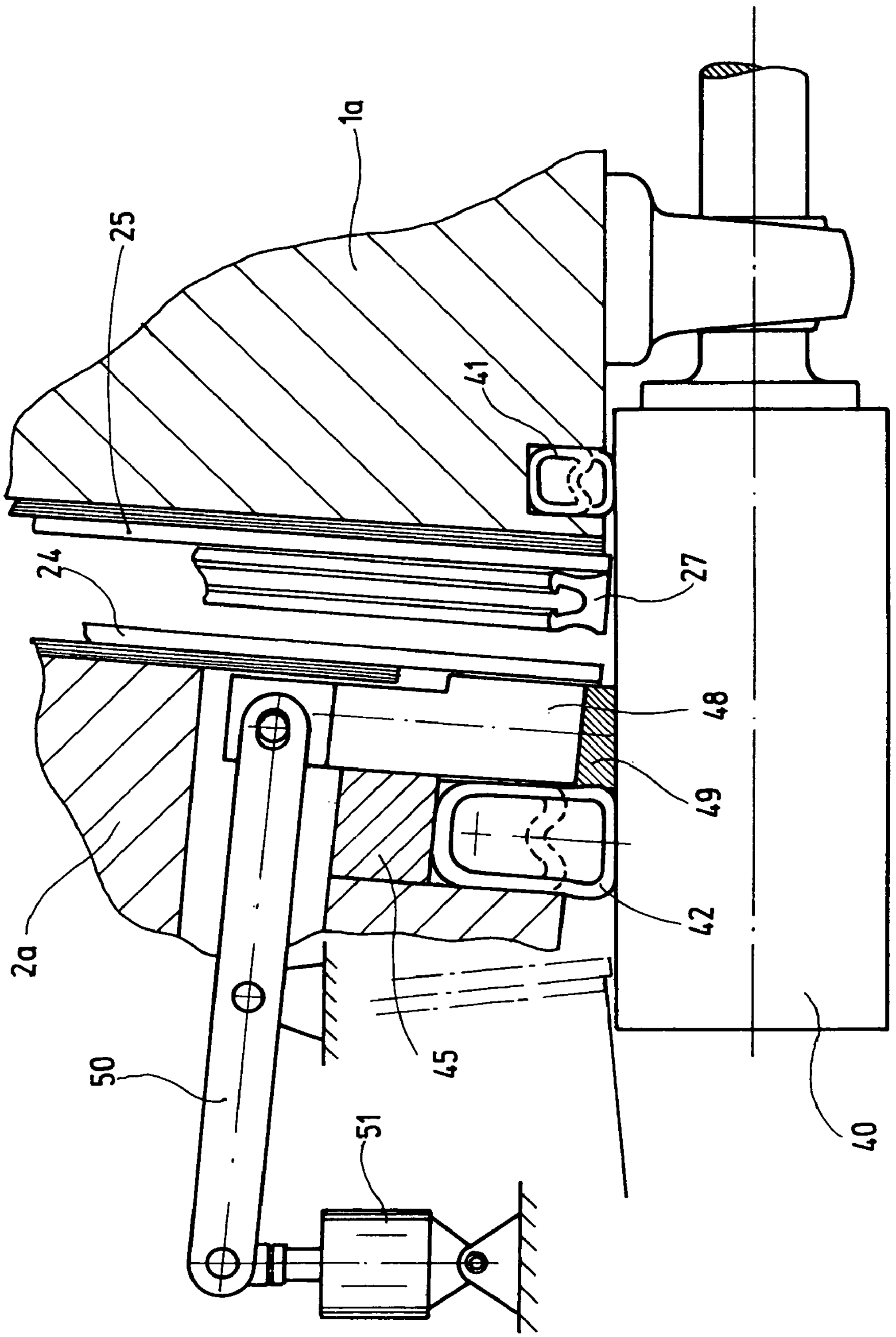
FIG. 13 shows a vertical section through the lower area of the device for assembling, gas-filling and pressing insulating glass panes, illustrating the same phase as FIG. 12, but taken through a partition wall of the heavy gas supply channel.
Figure 14:
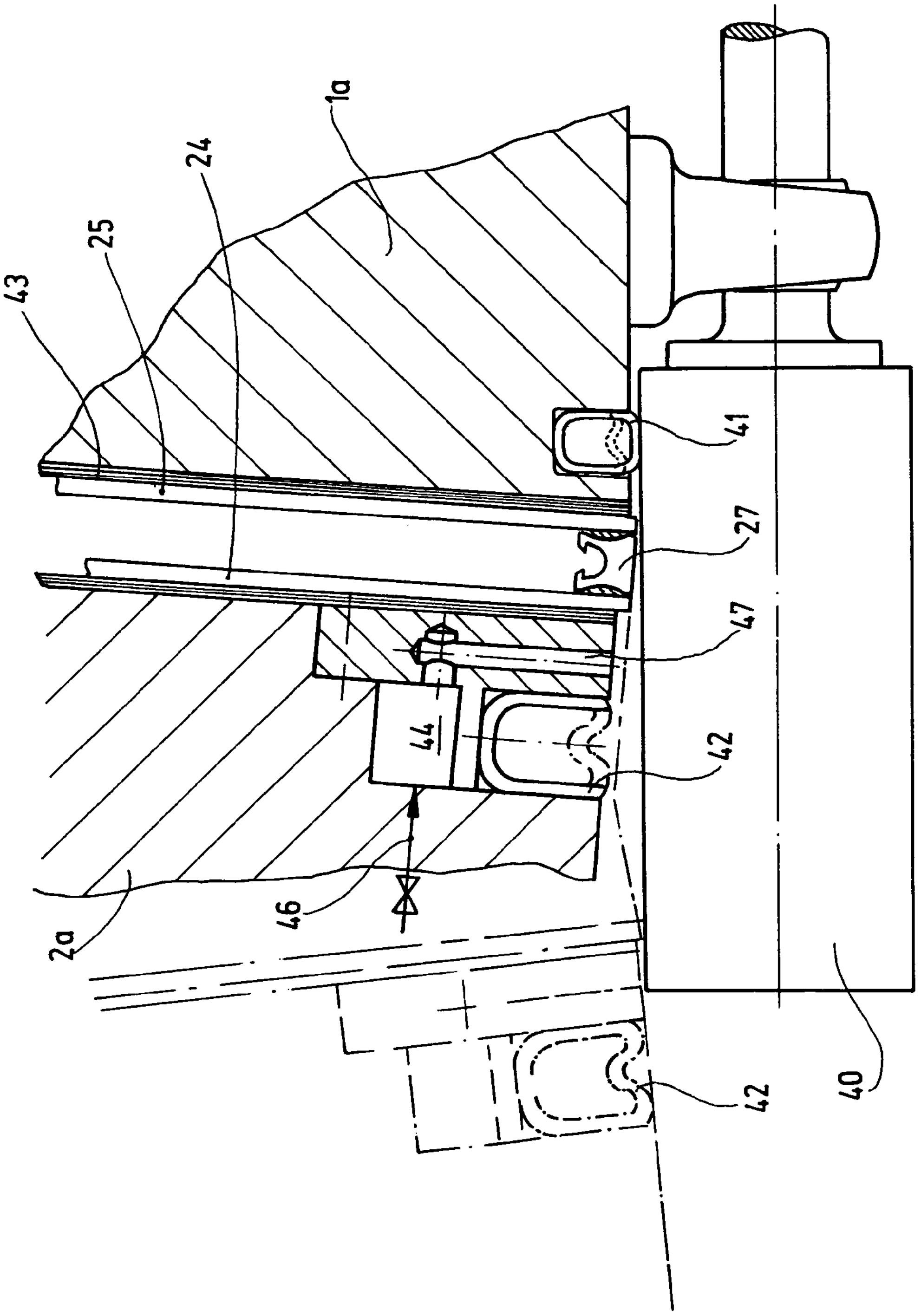
FIG. 14 shows a view, corresponding to FIG. 12, of the assembly, filling and pressing device, in the phase of the pressing operation.

Slides 48 provided at each point where the channel 44 is subdivided by partition walls 45—see FIG. 13—end flush with the surface of the rubber layer 43 and carry at their lower ends, facing the belt 40*a*, a layer 49 made from a resilient material. The slide 48 can be opened and closed by means of a two-armed lever 50 engaged by a pneumatic cylinder.

Sealing strips 52 provided opposite the slides 58 and extending from the top to the bottom in the stationary pressure plate 1*a* can be advanced toward the movable pressure plate 2*a* and its slide 48. To this end, the hose 41 may be subdivided into separate sections so that the sealing strip 52 can be pushed forward through a gap between two sections of the hose 41 which is then closed by the sealing strip 52. According to another possibility where the hose 41 may be uninterrupted over the full length of the pressure plate 1*a*, the selected configuration may be such that the drive for advancing the sealing strips 52 is designed in such a way that the strips can be moved against the movable pressure plate 2*a*, passing above the hose 41, and can then be lowered onto the belt 40*a*. According to a further possibility, the belt 40*a* can be supported on a rail which projects beyond the belt 40*a* below the stationary pressure plate 1*a* a sufficient length to permit a hose, extending over the full length of the stationary pressure plate 1*a*, to be fitted in a longitudinal groove extending adjacent the belt 40*a*. If the hose is then blown up, it applies itself to the bottom of the stationary pressure plate 1*a* in sealing relationship. When the hose 42 is blown up, it applies itself to the belt 40*a* in sealing relationship (FIG. 12).

Figure 19:
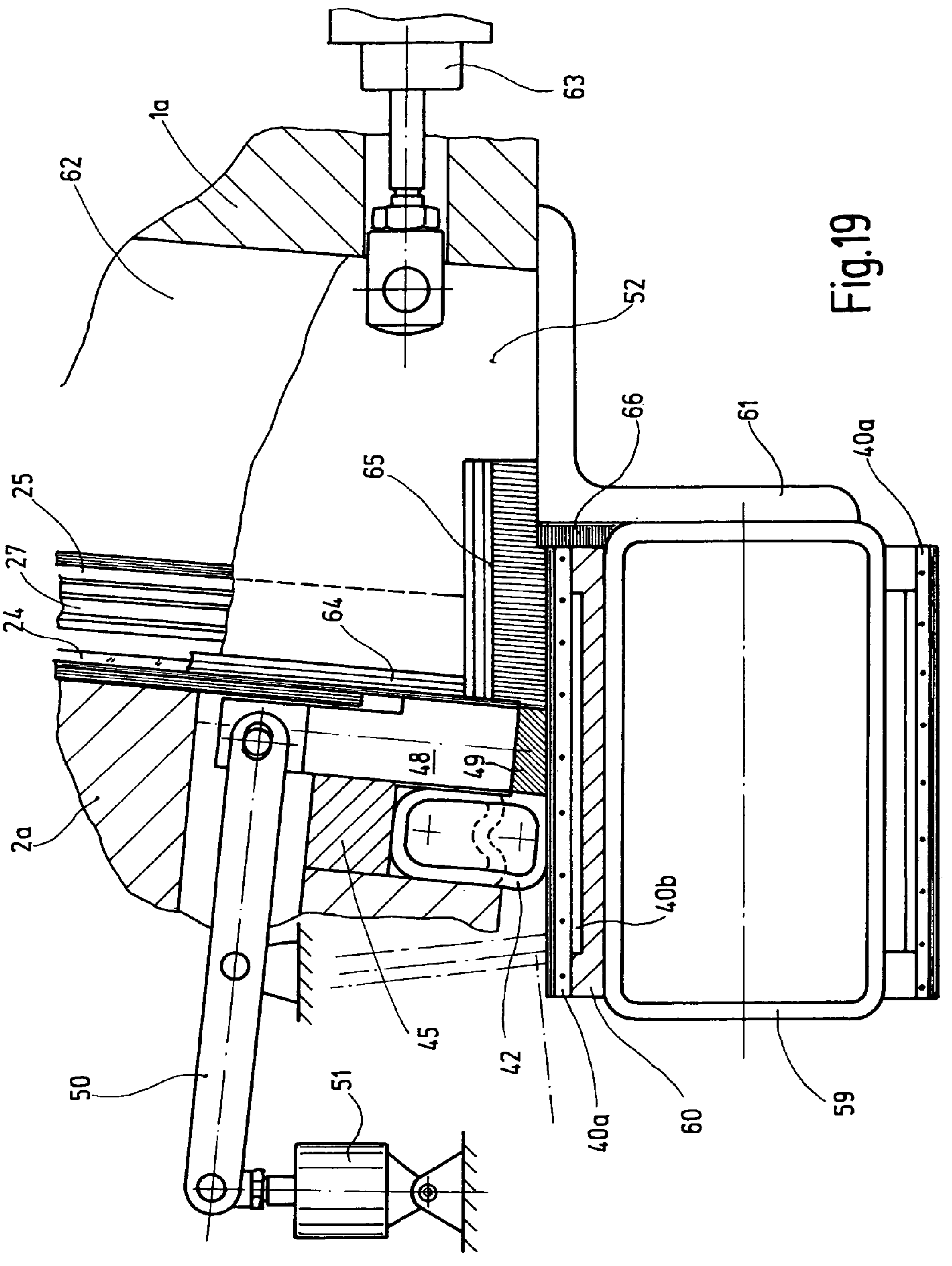
FIG. 19 shows a view, similar to FIG. 13, of a detail of an assembly, filling and pressing device with a modified sealing concept.

Another possibility to achieve a sealing effect between the stationary pressure plate 1*a* and the belt 40*a* is illustrated in FIG. 19. The belt 40*a* is a toothed belt whose teeth 40*b* do not extend over the full width of the bottom surface of the belt 40*a* and run in a recess in a flat rail 59 mounted on an elongated carrier 16 in the form of a hollow section. The carrier 60 is fixed on the bottom surface of the immovable pressure plate 1*a* by an L strap 61. The carrier 60 and the L strap 61 extend over the full length of the pressure plate 1*a*. Accordingly, no heavy gas can escape transversely to the conveying direction of the belt 40*a* below the stationary pressure plate 1*a*.

FIG. 19 further illustrates a possible configuration and arrangement of the sealing strip 52. The strip is positioned opposite the slide 48 in a vertical slot 62 in the stationary pressure plate in which in can be advanced and retracted by means of two pneumatic cylinders 63. One of the pneumatic cylinders 63 is illustrated in FIG. 19 and is located at the lower end of the sealing strip 52. A second pneumatic cylinder is correspondingly arranged at the upper end of the sealing strip, which is not shown in FIG. 19. At the forward edge of the sealing strip, there is provided a rubber strip 64 by which the sealing strip 52 hits against the oppositely arranged movable pressure plate 2*a* as it is advanced. At the lower end of the sealing strip 52, there is provided a recess that opens toward the oppositely arranged pressure plate 2*a* and in which a brush 65 is fitted whose bristles contact the L strap 61 and the upper run of the belt 40*a*. A further brush 66 is mounted on the L strap over its full length to fill a gap between the L strap on the one side and the belt 40*a* and the rail 59, the bristles extending from the L strap 61 to the opposite lateral surface of the belt 40*a* and the rail 59. The bristles 65 and 66 prevent any outflow of heavy gas in the conveying direction or against the conveying direction. For the rest, the structure of the embodiment illustrated in FIG. 19 corresponds to that illustrated in FIG. 13.

Together with the slide 48, upon which the sealing strip 52 hits in the advanced position, the strip acts to laterally seal the space in which the insulating glass panes are located in their non-assembled condition, and prevents any heavy gas from flowing in a transverse direction, out of the area of the insulating glass panes, during introduction of heavy gas. A heavy gas commonly used for purposes of the invention is argon.

Figure 15:
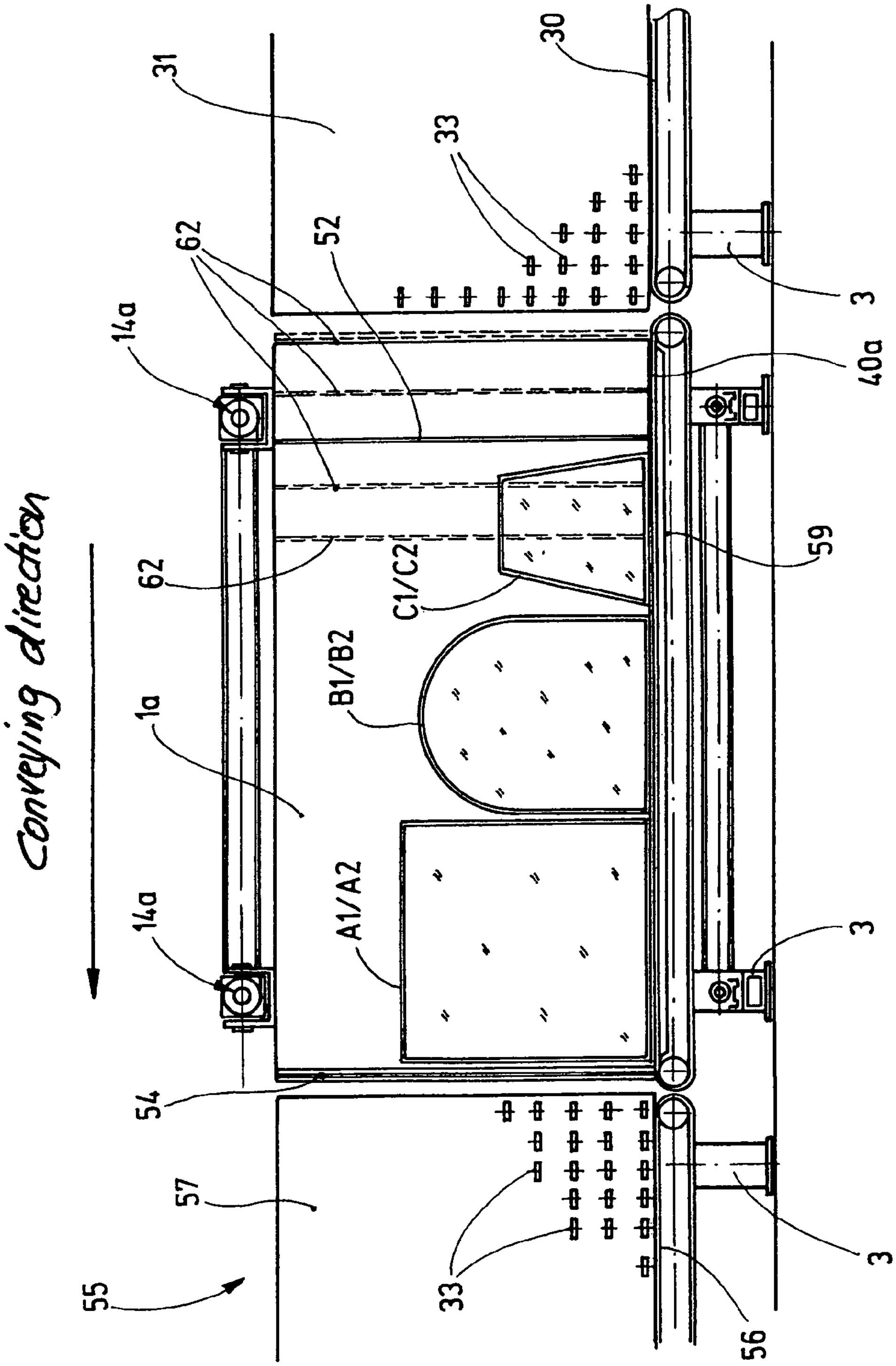
FIG. 15 shows a longitudinal section through the assembly, filling and pressing device according to FIG. 12, taken along line XV-XV in FIG. 12, before commencement of the gas-filling operation.

FIG. 15 shows that some such sealing strips 52 may be arranged in the rear area of the pressure plate 1*a*, whereas another sealing strip 54, that can be pivoted by means of a pneumatically operated four-bar linkage 58, can be pivoted against the vertical edges of the two pressure plates 1*a* and 2*a* in order to achieve a sealing effect relative to the pressure plates 1*a* and 1*b* and to the belt 40*a* so that the heavy gas is prevented from flowing out during the filling operation also at the forward end of the assembly and pressing device.

Figure 18:
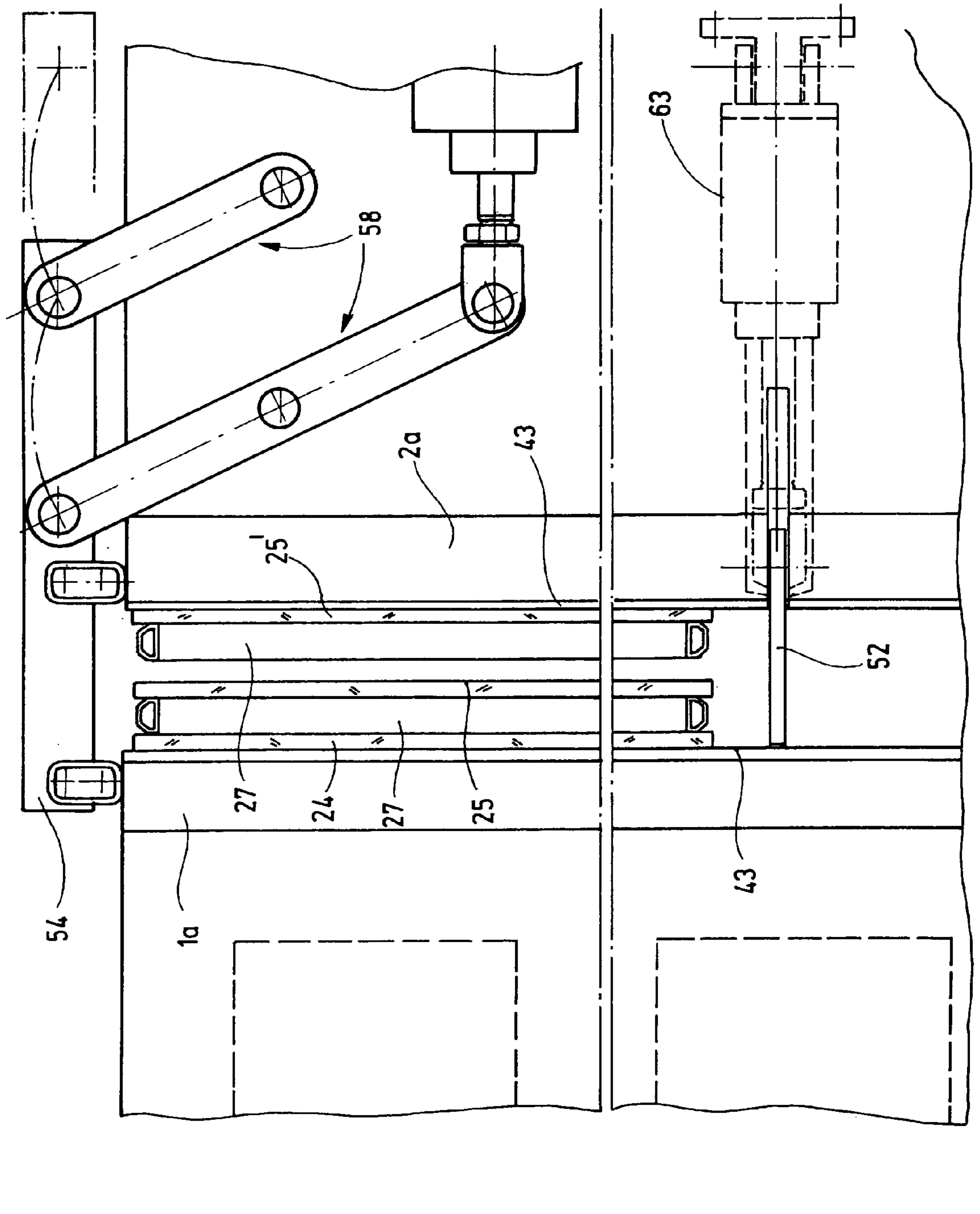
FIG. 18 shows a section, taken along line XVIII-XVIII perpendicularly to one of the pressure plates, illustrating a detail of the area of a seal arranged between the ends of the pressure plates and a further seal arranged at the front end of the pressure plates.

The assembly and pressing device for insulating glass panes operates as follows:

Glass sheet pairs, that have been placed in the buffer station, for example the glass sheet pairs A1/A2, B1/B2 and C1/C2, are conveyed into the assembly and pressing device by synchronous operation of the horizontal conveyors 30 and 40 and are positioned in the device in such a way that the forward edges of the leading glass sheets A1/A2 come to be located at the forward edge of the pressure plates 1*a* and 2*a*. At that time, the pressure plate 2*a* is still in its initial position illustrated in FIG. 11. As has been described before in connection with the pairing station, the movable pressure plate 2*a* now is at first pivoted into an intermediate position closer to the first pressure plate 1*a* and parallel to it. The first glass sheet 24 is lifted off the belt 40*a* by that operation. After having been pivoted into the parallel position, the movable pressure plate 2*a* is further approached to the stationary pressure plate 1*a*, in parallel to itself, until a second intermediate position is reached in which a gap remaining between the first glass sheet 24 and the spacer 27 has a width of only a few millimeters; suited for this purpose is a gap width of 2 mm to 6 mm, for example. The two intermediate positions of the first glass sheet 24 are illustrated by broken lines in FIG. 11. FIG. 12 shows the second intermediate position of the movable pressure plate 2*a*. In this second intermediate position, the gas can be introduced. To this end, the sealing strip 54 (see FIG. 18) is initially applied to the forward edge of the two pressure plates 1*a* and 2*a* and is placed on the belt 40*a* in order to seal the device in that area. In the rear area of the assembly and pressing device, the sealing strip 52, which is the closest to the rear edge of the rear glass sheet pair C1/C2, is pushed out of the stationary pressure plate 1*a* to effect sealing in that area (FIG. 18). Further, the slide 48, opposite the sealing strip 52 to be displaced, is pushed down against the belt 40*a* to seal the gap between the belt 40*a* and the lower edge of the movable pressure plate 2*a* (see FIG. 13). This prevents any heavy gas, supplied via the channel 44 and the branch ducts 47, from escaping against the conveying direction. As a result of the filling process, the heavy gas rises between the glass sheet pairs A1/A2, B1/B2 and C1/C2—see FIG. 16. Due to the inclined position of the glass sheets 24 and 25 on the belt 40*a*, the gap between the first glass sheet 24 and the belt 40*a* has a width of between approximately 2 mm to approximately 5 mm, depending on the thickness of the insulating glass pane to be produced, which is fully sufficient to allow almost pressureless introduction of the gas into the space between the glass sheets 24 and 25 so that the lighter air will be displaced to the top without greater turbulences, over the full length of the glass sheet pairs, and a high filling degree of the heavy gas will be quickly reached with only little losses of heavy gas. The heavy gas need not rise up to the upper edge of the highest glass sheet pair A1/A2; instead, the supply of heavy gas may be stopped already when a lower level 53 is reached, as illustrated in FIG. 6, because the insulating glass panes still have to be closed and pressed by moving the movable pressure plate 2*a* against the stationary pressure plate 1*a*—see FIG. 14—and the heavy gas present between the glass sheet pairs will be further displaced to the top by that closing movement, so that the insulating glass panes will be filled with heavy gas in full or almost in full. The volume of gas to be displaced during closing of the insulating glass panes can be easily determined by calculation and can be taken into account when determining the amount of heavy gas to be supplied.

Figure 16:
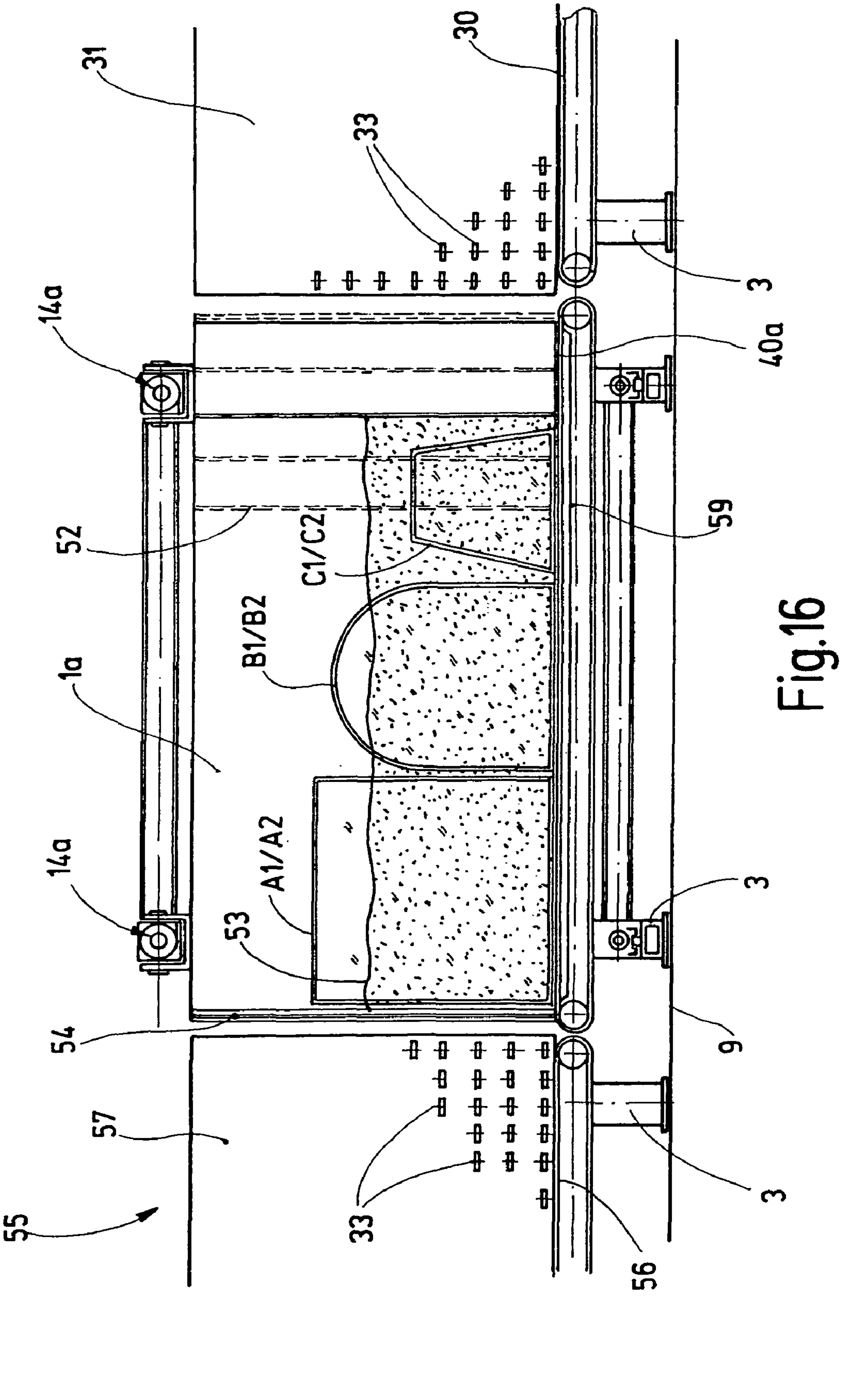
FIG. 16 shows a section corresponding to FIG. 15, illustrating a later phase of the gas-filling operation.
Figure 17:
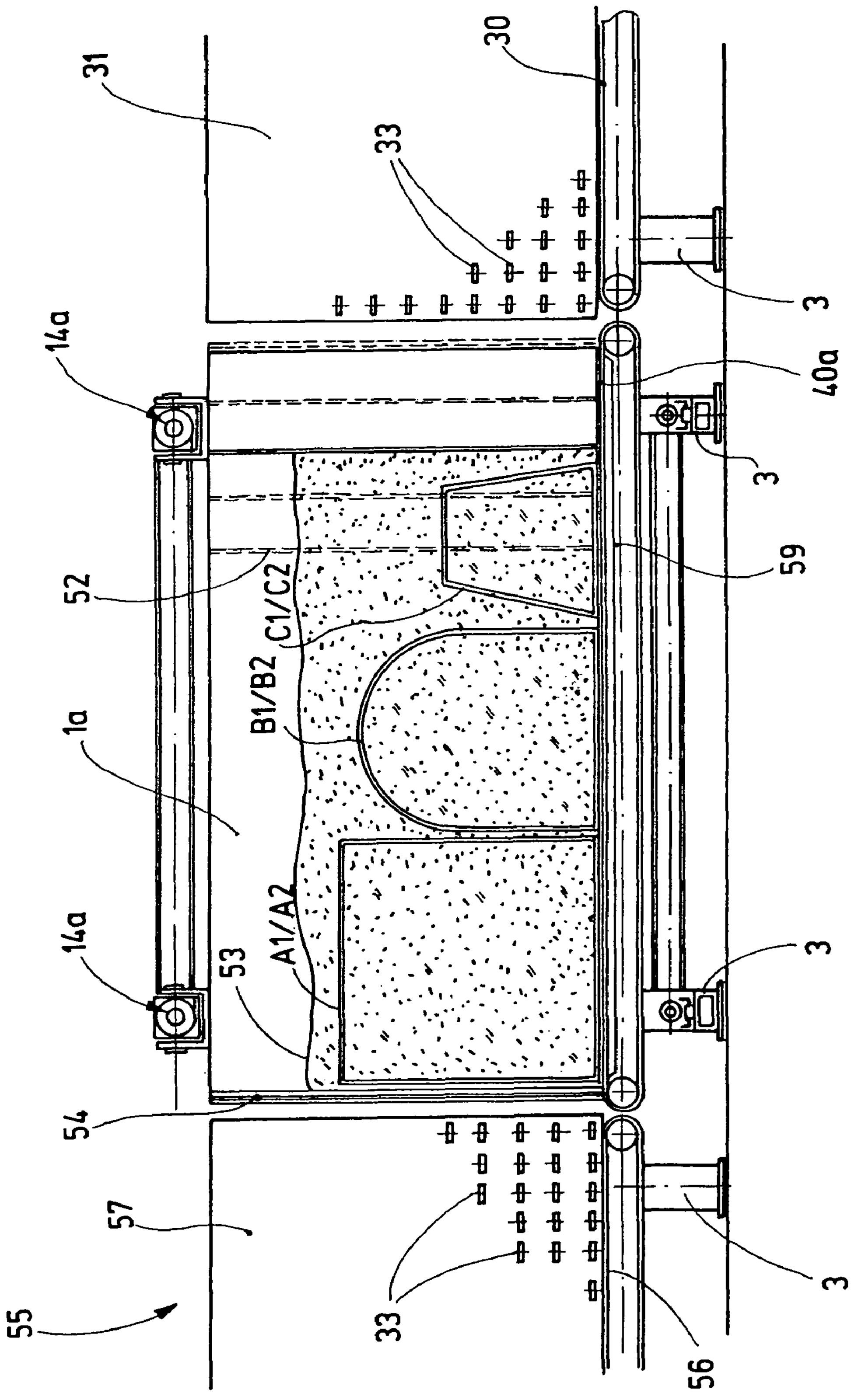
FIG. 17 shows a section, corresponding to FIG. 15, illustrating the end of the gas-filling operation, after the insulating glass panes have been closed, where the pressure plates have assumed the position illustrated in FIG. 14.

During closing of the insulating glass panes, the sealing strip 52 is initially urged back into the stationary pressure plate 1*a* by a corresponding amount and, once the insulating glass panes have been closed and pressed, is then fully retracted into the stationary pressure plate 1*a*. As the insulating glass panes are closed, the level 53 of the heavy gas rises above the upper edge of the highest insulating glass pane A1/A2, as illustrated in FIG. 17. After the insulating glass panes have been closed and pressed, they are transported, by operation of the horizontal conveyor 40, out of the assembly and pressing device and onto a discharge conveyor 55—see FIGS. 10 and 17—which comprises a horizontal conveyor 56 aligned flush with the horizontal conveyor 40 and a supporting device 57, which is aligned with the stationary pressure plate 1*a* and which, though it may consist of an air-cushion wall, preferably is configured in the same way as the supporting devices 31 and 32 in the buffer station—as illustrated in FIG. 16—and, correspondingly, comprises a field of freewheeling rollers 33.

In order to keep possible losses of heavy gas as small as possible, it is recommended to take care in planning the production process that the order in which the insulating glass panes are assembled is selected to ensure that the insulating glass panes assembled as one lot differ in height as little as possible.

Once the assembled insulating glass panes A1/A2, B1/B2, C1/C2 leave the assembly and pressing device, the next following glass sheet pairs D1/D2, E1/E2, F1/F2 can be fed into the assembly and pressing device as one lot—see FIG. 10.

Given the fact that instead of being placed on the belt 40*a* in vertical arrangement, the glass sheets are inclined in the assembly and pressing device so that they act on the belt 40*a* only by their lower edges, they can be transported free from slippage so that their exact alignment will not get lost. Further, they can be filled with heavy gas from below over their full length without any need to provide a permeable belt which is drawn over the gas-filling channel, or to provide two spaced belts in the horizontal conveyor between which heavy gas can be introduced between the glass sheets—an advantageous solution which has not been known in the art. Instead, it is possible according to the invention to use a conveying element consisting of a uniform, absolutely tight belt 40*a* because the heavy gas can be introduced without any problems from the side of the movable pressure plate 2*a* through a gap between the belt 40 and one of the glass sheets 24. This permits a much simpler structure of the assembly and pressing device with gas-filling system, than has been possible before, and, as two or more than two insulating glass panes are filled with heavy gas simultaneously, also allows short cycle times and cheaper production of insulating glass panes than has been known before, and this especially when producing insulating glass panes of common standard dimensions. On the other hand, the invention can be used for many different applications, not only for the production of rectangular insulating glass panes, but also for the production of what is known as model panes, with a contour different from a rectangular shape. Corresponding examples are illustrated in FIGS. 7 to 10 and 15 to 17. Moreover, three-sheet insulating glass panes can be produced as well. In this case, one initially assembles two glass sheets filled with gas—as described before—and then transports the third glass sheets, that have been positioned in a row in the buffer station before, into the assembly and pressing device for assembling them with the first and second glass sheets, and for filling them with gas, as illustrated in FIG. 18.

Further, large format insulating glass panes of a size that permits only a single one of such panes to be placed in the assembly and pressing device, can produced in the same way as in a conventional production line for insulating glass panes. In this case, the process may include the steps of transporting the two glass sheets, leaning against the immovable supporting devices, one after the other through the pairing station and through the buffer station and into the assembly and pressing device, and of arranging them in opposite pairs only at that point by causing the movable pressure plate 2*a* to attract that glass sheet, which arrives first, by suction and to thereby take over the sheet and make room for delivery of the second glass sheet that carries the spacer.

In all these cases, the heavy gas is permitted to rise in a constant upward flow, without greater turbulences, between parallel glass sheets, and to displace the lighter weight to the top without getting mixed with it.

Finally, it is also possible to assemble insulating glass panes without filling them with a heavy gas.

LIST OF REFERENCE NUMERALS

1. Supporting device
1*a*. Plate
2. Supporting device
2*a*. Plate
3. Frame
4. Holes
5. Hood
6. Chamber
7. Base
8. Struts
9. Horizontal line
10. Axis
11. Carriage
12. Rails
13. Motor
13*a*. Motor
14. Spindle drive
14*a*. Spindle drive
15. Spindle
15*a*. Spindle
16. Housing
16*a*. Housing
17. Holder
17*a*. Holder
18. Holder
20. Horizontal conveyor, first track
20*a*. Belt
21. Motor
22. Axes
23. Gap
24. Glass sheet
25. Glass sheet
26. Feeder
27. Spacer
30. Horizontal conveyor, second track
31. Supporting device
32. Supporting device
33. Rollers
34. Axis
35. Tangential plane
36. Tangential plane
40. Horizontal conveyor, third track
40*a*. Belt
40*b*. Teeth
41. Hose
42. Hose
43. Rubber layer
44. Channel
45. Partition walls
46. Supply line
47. Branch duct
48. Slide
49. Layer made from a sealing material
50. Lever
51. Pneumatic cylinder
52. Sealing strip
53. Level
54. Sealing strip
55. Discharge conveyor
56. Horizontal conveyor
57. Supporting device
58. Four-bar linkage 59. Rail
60. Carrier
61. L strap
62. Slot
63. Pneumatic cylinder
64. Rubber strip
65. Brush
66. Brush

The invention claimed is:

1. Method for positioning glass sheets, that are arranged in pairs one opposite the other, in a vertical assembly and pressing device for insulating glass panes which is part of a production line for insulating glass panes, in which a first glass sheet and a second glass sheet carrying a spacer, intended for an insulating glass pane, are fed into the assembly and pressing device in upright position, standing on a horizontal conveyor and leaning against a first supporting device, the assembly and pressing device comprising an arrangement consisting of two pressure plates that can be transferred from a first position, in which they are inclined in opposite directions, to a second position in which they are positioned one in parallel to the other, by (a) conveying the first glass sheet, leaning against the first supporting device, on a first track of the horizontal conveyor into a predefined first position in which it is stopped; (b) transferring the first glass sheet in a direction transverse to the conveying direction of the horizontal conveyor into a position opposite the first position, in which it stands on the horizontal conveyor in upright position, supported against the second supporting device inclined in a direction opposite to the direction of the first supporting device; (c) conveying the second glass sheet, leaning against the first supporting device into the first position; (d) synchronously conveying the first and the second glass sheets, leaning against their respective supporting devices into a predefined second position on a second track of the horizontal conveyor that can be driven separately from the first track of the horizontal conveyor; (e) repeating the steps (a) to (d) at least once for glass sheets intended for assembly of at least one further insulating glass pane; (f) conveying the glass sheet pairs, standing upright on the second track of the horizontal conveyor, into the opened assembly and pressing device, which latter comprises a third track of the horizontal conveyor that can be driven separately from the second track of the horizontal conveyor; (g) stopping the glass sheet pairs in the assembly and pressing device.

2. The method as defined in claim 1, wherein the two glass sheets intended for one insulating glass pane are conveyed on at least one of the tracks of the horizontal conveyor, the conveyer having conveyor elements, in upright position standing on the same conveyor element and inclined in opposite directions.

3. The method as defined in claim 1, wherein the two glass sheets intended for one insulating glass pane are conveyed on at least one of the tracks of the horizontal conveyor, on conveyor elements arranged in pairs one beside the other and inclined in opposite directions, by driving such elements in synchronism.

4. The method as defined in claim 2, wherein at least the conveyor elements of the third track of the horizontal conveyor are belts.

5. The method as defined in claim 1, wherein the second position is selected in such a way that the rear edge of the respective first and second glass sheets comes to lie in said second position adjacent the forward end of the first track of the horizontal conveyor.

6. The method as defined in claim 1, wherein the pairs of first and second glass sheets are positioned in the second track of the horizontal conveyor in close succession.

7. The method as defined in claim 1, wherein the third track of the horizontal conveyor can be selectively driven and stopped separately from the first track of the horizontal conveyor.

8. Device for positioning glass sheets, that are arranged in pairs one opposite the other, in a vertical assembly and pressing device for insulating glass panes which is intended for being integrated in a production line for insulating glass panes, in which a first glass sheet and a second glass sheet carrying a spacer, intended for an insulating glass pane, are fed into the assembly and pressing device said sheets being in an upright position, standing on a horizontal conveyor, which is subdivided into several tracks, and supported against a first supporting device, the assembly and pressing device having a third track of the horizontal conveyer and comprising an arrangement consisting of a first and a second pressure plates, arranged above the horizontal conveyor, that can be transferred from a first position, in which they are inclined in opposite directions, to a second position in which they are positioned one in parallel to the other, having a second track of the horizontal conveyor arranged upstream of the assembly and pressing device, which can be driven and stopped separately from the third track of the horizontal conveyor or in synchronism with said third track; having two supporting devices arranged above the second track of the horizontal conveyor, which are inclined in opposite directions in such a way that they are aligned with the pressure plates when said pressure plates occupy their first position; wherein a first track of the horizontal conveyor, arranged upstream of the second track of the horizontal conveyor, can be driven and stopped separately from the second track of the horizontal conveyor or in synchronism with said second track; that a first and a second supporting device arranged above the first track of the horizontal conveyor, are inclined in opposite directions in such a way that they are aligned with the pressure plates when said pressure plates occupy their first position that being an initial position of the movable pressure plate; and that means for transferring the respective first glass sheet from the first supporting device to the second supporting device in its oppositely inclined position, relative to the first supporting device, are provided in the area of the first track of the horizontal conveyor.

9. The device as defined in claim 8, wherein the third track of the horizontal conveyor can be driven and stopped separately from the first track of the horizontal conveyor and also in synchronism with the latter.

10. The device as defined in claim 8, wherein at least one of the tracks of the horizontal conveyor comprises conveyor elements designed in such a way that they are capable of simultaneously supporting both glass sheets intended for one insulating glass pane, in oppositely inclined positions one relative to the other.

11. The device as defined in claim 8, wherein at least one of the tracks of the horizontal conveyor comprises conveyor elements arranged in pairs one beside the other, that can be driven in synchronism by common drive members.

12. The device as defined in claim 10, wherein at least the conveyor elements of the third track of the horizontal conveyor are belts, especially toothed belts.

13. The device as defined in claim 8, wherein a position sensor responsive of the glass sheets, which is capable of stopping the drive of the second track of the horizontal conveyor, is associated to the rear end of the second track of the horizontal conveyor.

14. The device as defined in claim 8, wherein the second track of the horizontal conveyor has at least the same length as the pressure plates.

15. The device as defined in claim 8, wherein the first track of the horizontal conveyor is shorter in length than the pressure plates.

16. The device as defined in claim 15, wherein the first track of the horizontal conveyor has a length of not more than half the length of the pressure plates.

17. The device as defined in claim 8, wherein the second supporting device, provided above the first track of the horizontal conveyor, comprises a supporting device plate with openings or holes through which air can be selectively drawn in or blown out using a blower, and that the supporting device plate can be approached to, and aligned in parallel with, the first supporting device arranged opposite to it.

18. The device as defined in claim 17, wherein the first supporting device is immovable.

19. The device as defined in claim 17, wherein the supporting device plate, for being approached to the opposite first supporting device, can be pivoted from its initial position, in which it is aligned with the second pressure plate, about an axis parallel to the conveying direction of the horizontal conveyor into an intermediate position parallel to the first supporting device, and can be displaced in parallel to itself, perpendicularly to the conveying direction.

20. The device as defined in claim 19, wherein that pivot axis extends below a transporting surface of the horizontal conveyor.

21. The device as defined in claim 19, wherein the supporting device plate can be stopped in its intermediate position.

22. The device as defined in claim 8, wherein the horizontal conveyor has coinciding upper tangential planes in its first, second and third tracks, the tangential planes enclosing with the sides of the pressure plates which face each other in their oppositely inclined positions, angles that are greater than 90.degree.

23. The device as defined in claim 22, wherein the upper tangential planes are horizontal.

24. The device as defined in claim 19, wherein the second pressure plate can be moved in the same way in which the second supporting device plate is moved in the area of the track of the horizontal conveyor.

25. The device as defined in claim 8, wherein the first pressure plate is immovable.

26. The device as defined in claim 24, wherein the second pressure plate is positioned in parallel relative to the first pressure plate at a spacing of at least 45 mm and can be further approached to the first pressure plate by linear parallel displacement.

27. The device as defined claim 19, the supporting device plate being moveable, wherein the position of the pivot axis is selected to ensure that the lower edge of a first glass sheet, that has been attached to the movable plate by suction, having been picked up from the opposite first supporting device, has a small distance from the transporting surface of the horizontal conveyor when the movable plate has reached its initial position, aligned with the second pressure plate in its initial position, in which it is inclined in a direction opposite to the first supporting device.

28. The device as defined in claim 8, wherein the belt has a width of at least 100 mm.

29. The device as defined in any of claims 13 to 28, wherein the belt in the assembly and pressing device has a width of at least 120 mm, especially 120 mm to 140 mm.

30. The method as defined in claim 3, wherein at least the conveyor elements of the third track of the horizontal conveyor are belts, especially toothed belts.

31. The method as defined in claim 1, wherein the third track of the horizontal conveyor can be selectively driven and stopped in synchronism with the horizontal conveyor.

32. The device as defined in claim 11, wherein at least the conveyor elements of the third track of the horizontal conveyor are belts, especially toothed belts.

33. The device as defined in claim 22, wherein the angles, which the tangential planes enclose with the sides of the pressure plates, equal one to the other.

34. The device as defined in claim 26, wherein the spacing between the first and second pressure plates is 50 to 60 mm.

35. The device as defined in claim 27, wherein the lower edge of the first glass sheet has a distance of not more than 2 mm from the transporting surface of the horizontal conveyor.

36. The device as defined in claim 28, wherein the belt has a width of 100 mm to 120 mm.

37. The device as defined in claim 10, wherein the belt has a width of at least 100 mm.

38. The device as defined in claim 12, wherein the belt has a width of at least 100 mm.

39. The device as defined in claim 10, wherein the belt in the assembly and pressing device has a width of at least 120 mm, especially 120 mm to 140 mm.

40. The device as defined in claim 12, wherein the belt in the assembly and pressing device has a width of at least 120 mm, especially 120 mm to 140 mm.

41. The method as defined in claim 2, wherein at least the conveyor elements of the third track of the horizontal conveyor are toothed belts.

* * * * *